(12) United States Patent
Imanilov et al.

(10) Patent No.: US 11,784,693 B1
(45) Date of Patent: Oct. 10, 2023

(54) COVERAGE CLUSTER-BASED BEAMFORMING IN A WIRELESS NODE IN A WIRELESS COMMUNICATIONS SYSTEM (WCS)

(71) Applicant: Corning Research & Development Corporation, Corning, NY (US)

(72) Inventors: Benjamin Imanilov, Hod haSharon (IL); Viacheslav Viacheslavovich Ivanov, St. Petersburg (RU)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 0 days.

(21) Appl. No.: 17/890,343

(22) Filed: Aug. 18, 2022

(51) Int. Cl.
*H04B 7/06* (2006.01)
*H04B 7/0426* (2017.01)

(52) U.S. Cl.
CPC ............ *H04B 7/0617* (2013.01); *H04B 7/043* (2013.01)

(58) Field of Classification Search
CPC .............................. H04B 7/0617; H04B 7/043
See application file for complete search history.

(56) References Cited

U.S. PATENT DOCUMENTS

| | | | | |
|---|---|---|---|---|
| 7,257,418 | B1* | 8/2007 | Chang | H04B 7/18545 455/12.1 |
| 2009/0305723 | A1* | 12/2009 | Barraclough | H04W 64/00 455/456.1 |
| 2019/0268779 | A1 | 8/2019 | Peroulas et al. | |

(Continued)

FOREIGN PATENT DOCUMENTS

| | | |
|---|---|---|
| CN | 111093163 A | 5/2020 |
| CN | 111553469 A | 8/2020 |

(Continued)

OTHER PUBLICATIONS

A. Adhikary, et al., "Joint Spatial Division and Multiplexing—The Large-Scale Array Regime," in IEEE Transactions on Information Theory, vol. 59, No. 10, pp. 6441-6463, Oct. 2013, doi: 10.1109/TIT.2013.2269476.

(Continued)

*Primary Examiner* — Vineeta S Panwalkar
(74) *Attorney, Agent, or Firm* — William D. Doyle

(57) ABSTRACT

Coverage cluster-based beamforming in a wireless node in a wireless communications system (WCS) is provided. In a conventional beamforming system, a wireless node (e.g., base station) periodically emits multiple reference beams, each steered toward a predefined direction, to provide a blanket coverage in a coverage area. Contrary to providing the blanket coverage, a wireless node disclosed herein is configured to provide targeted coverage in a coverage area. Specifically, the wireless node is configured to dynamically group multiple coverage points (e.g., user equipment, high user density area, etc.) into multiple coverage clusters. Accordingly, the wireless node can form and steer a respective reference beam toward each of the coverage clusters. By supporting coverage cluster-based beamforming in the wireless node, it is possible to achieve blanket coverage in the coverage area with a lesser number of reference beams, thus helping to reduce computational complexity and signaling overhead in the wireless node.

20 Claims, 13 Drawing Sheets

(56) References Cited

U.S. PATENT DOCUMENTS

2019/0372644 A1    12/2019    Chen et al.

FOREIGN PATENT DOCUMENTS

| | | |
|---|---|---|
| CN | 111742568 A | 10/2020 |
| WO | 2019/177419 A1 | 9/2019 |

OTHER PUBLICATIONS

A. Padmanabhan, et al., "Interference Management via User Clustering in Two-Stage Precoder Design," 2018 IEEE 19th International Workshop on Signal Processing Advances in Wireless Communications (SPAWC), 2018, pp. 1-5, doi: 10.1109/SPAWC.2018.8446017.

Bradley, Paul S., et al., "Constrained k-means clustering." Microsoft Research, Redmond, vol. 20.0, 2000.

D. Arthur, et al., "k-means++: The Advantages of Careful Seeding", Technical Report 2006-13, Stanford InfoLab, 2006.

Ganganath, et al., "Data clustering with cluster size constraints using a modified k-means algorithm", 2014 International Conference on Cyber-Enabled Distributed Computing and Knowledge Discovery, IEEE, 2014.

Höppner, Frank, et al., "Clustering with size constraints", Computational Intelligence Paradigms, Springer, Berlin, Heidelberg, 2008, pp. 167-180.

Hu, C., et al., "Shrinkage Clustering: a fast and size-constrained clustering algorithm for biomedical applications", BMC Bioinformatics, vol. 19, No. 19, 2018, https://doi.org/10.1186/s12859-018-2022-8.

Incremental fartherst neighbor search algorithm, https://flothesof.github.io/farthest-neighbors.html, Rtreived on Sep. 28, 2022.

J. Mo et al., "Beam Codebook Design for 5G mmWave Terminals," in IEEE Access, vol. 7, pp. 98387-98404, 2019, doi: 10.1109/ACCESS.2019.2930224.

Measuring distances. Applied multivariate statistics—Spring 2012 https://stat.ethz.ch/education/semesters/ss2012/ams/slides/v4.2.pdf.

Muhammad Fahad Khan, et al., "Survey and taxonomy of clustering algorithms in 5G, Journal of Network and Computer Applications", vol. 154, 2020, 102539, ISSN 1084-8045, https://doi.org/10.1016/j.jnca.2020.102539.

Müllner, Daniel, "fastcluster: Fast hierarchical, agglomerative clustering routines for R and Python", Journal of Statistical Software, vol. 53.9, 2013, pp. 1-18.

Pasi Fränti, et al., "How much can k-means be improved by using better initialization and repeats?", Pattern Recognition, vol. 93, 2019, pp. 95-112, ISSN 0031-3203.

Pelleg, Dan, et al., "X-means: Extending k-means with efficient estimation of the number of clusters", Icml. vol. 1. 2000.

Raied Salman, et al., "Fast K-means algorith clustering", International Journal of Computer Networks & Communications, vol. 3, No. 4, Jul. 2011, 16 pages.

Robert L. Thorndike, "Who Belongs in the Family?", Psychometrika, vol. 18 (4), Dec. 1953, pp. 267-276.

Roux, Maurice, "A comparative study of divisive and agglomerative hierarchical clustering algorithms", Journal of Classification, vol. 35.2, 2018, pp. 345-366.

S. Baadel, et al., "Overlapping clustering: A review," 2016 SAI Computing Conference, 2016, pp. 233-237, doi: 10.1109/SAI.2016.7555988.

Thanh N. Tran, et al., "Revised DBSCAN algorithm to cluster data with dense adjacent clusters", Chemometrics and Intelligent Laboratory Systems, vol. 120, 2013, pp. 92-96. DOI: 10.1016/j.chemolab.2012.11.006.

Unweighted pair group method with arithmetic mean (UPGMA) clustering algorithm description https://en.wikipedia.org/wiki/UPGMA, Retreived on Sep. 28, 2022.

Vaggos Chatziafratis, et al., "Hierarchical Clustering with Structural Constraints", Proceedings of the 35th International Conference on Machine Learning, PMLR, vol. 80, 2018, pp. 774-783.

Von Luxburg, et al., "A tutorial on spectral clustering", Statistics and computing, vol. 17.4, 2007, pp. 395-416.

Weighted pair group method with arithmetic mean (WPGMA) clustering algorithm description, https://en.wikipedia.org/wiki/WPGMA, Retreived on Sep. 28, 2022.

Yonggang Lu, et al., "PHA: A fast potential-based hierarchical agglomerative clustering method", Pattern Recognition, vol. 46, Issue 5, 2013, pp. 1227-1239, ISSN 0031-3203.

* cited by examiner

PROCESS
(500)

502 — DETERMINE A RESPECTIVE CLUSTERING DISTANCE METRIC ($d(P_1,P_2)$) BETWEEN EACH PAIR (($P_1,P_2$)) OF A PLURALITY OF COVERAGE POINTS (406) CONFIGURED TO RECEIVE A PREDETERMINED NUMBER OF RADIO FREQUENCY (RF) MEANS (404(1)-404(M)) EMITTED FROM A WIRELESS NODE (400)

504 — GROUP THE PLURALITY OF COVERAGE POINTS (406) INTO A PREDETERMINED NUMBER OF COVERAGE CLUSTERS (408(1)-408(M)) BASED ON THE RESPECTIVE CLUSTERING DISTANCE METRIC ($d(P_1,P_2)$) BETWEEN EACH PAIR (($P_1,P_2$)) OF THE PLURALITY OF COVERAGE POINTS (406), WHEREIN EACH OF THE PREDETERMINED NUMBER OF COVERAGE CLUSTERS (408(1)-408(M)) COMPRISES A SUBSET OF THE PLURALITY OF COVERAGE POINTS (406) AND RECEIVES A RESPECTIVE ONE OF THE PREDETERMINED NUMBER OF RF BEAMS (404(1)-404(M))

FIG. 5

COVERAGE CLUSTER-BASED BEAMFORMING IN A WIRELESS NODE IN A WIRELESS COMMUNICATIONS SYSTEM (WCS)

BACKGROUND

The disclosure relates generally to radio frequency (RF) beamforming in a wireless communications system (WCS), which can include a fifth generation (5G) system, a 5G new-radio (5G-NR) system, and/or a distributed communications system (DCS).

Wireless communication is rapidly growing, with ever-increasing demands for high-speed mobile data communication. As an example, local area wireless services (e.g., so-called "Wi-Fi" systems) and wide area wireless services are being deployed in many different types of areas (e.g., coffee shops, airports, libraries, etc.). Communications systems have been provided to transmit and/or distribute communications signals to wireless nodes called "clients," "client devices," or "wireless client devices," which must reside within the wireless range or "cell coverage area" in order to communicate with an access point device. Example applications where communications systems can be used to provide or enhance coverage for wireless services include public safety, cellular telephony, wireless local access networks (LANs), location tracking, and medical telemetry inside buildings and over campuses. One approach to deploying a communications system involves the use of radio nodes/base stations that transmit communications signals distributed over physical communications medium remote units forming RF antenna coverage areas, also referred to as "antenna coverage areas." The remote units each contain or are configured to couple to one or more antennas configured to support the desired frequency(ies) of the radio nodes to provide the antenna coverage areas. Antenna coverage areas can have a radius in a range from a few meters up to twenty meters, as an example. Another example of a communications system includes radio nodes, such as base stations, that form cell radio access networks, wherein the radio nodes are configured to transmit communications signals wirelessly directly to client devices without being distributed through intermediate remote units.

For example, FIG. 1 is an example of a WCS 100 that includes a radio node 102 configured to support one or more service providers 104(1)-104(N) as signal sources (also known as "carriers" or "service operators"—e.g., mobile network operators (MNOs)) and wireless client devices 106(1)-106(W). For example, the radio node 102 may be a base station (eNodeB) that includes modem functionality and is configured to distribute communications signal streams 108(1)-108(S) to the wireless client devices 106(1)-106(W) based on communications signals 110(1)-110(N) received from the service providers 104(1)-104(N). The communications signal streams 108(1)-108(S) of each respective service provider 104(1)-104(N) in their different spectrums are radiated through an antenna 112 to the wireless client devices 106(1)-106(W) in a communication range of the antenna 112. For example, the antenna 112 may be an antenna array. As another example, the radio node 102 in the WCS 100 in FIG. 1 can be a small cell radio access node ("small cell") that is configured to support the multiple service providers 104(1)-104(N) by distributing the communications signal streams 108(1)-108(S) for the multiple service providers 104(1)-104(N) based on respective communications signals 110(1)-110(N) received from a respective evolved packet core (EPC) network $CN_1$-$CN_N$ of the service providers 104(1)-104(N) through interface connections. The radio node 102 includes radio circuits 118(1)-118(N) for each service provider 104(1)-104(N) that are configured to create multiple simultaneous RF beams ("beams") 120(1)-120(N) for the communications signal streams 108(1)-108(S) to serve multiple wireless client devices 106(1)-106(W). For example, the multiple RF beams 120(1)-120(N) may support multiple-input, multiple-output (MIMO) communications.

The radio node 102 of the WCS 100 in FIG. 1 may be configured to support service providers 104(1)-104(N) that have a different frequency spectrum and do not share the spectrum. Thus, in this instance, the communications signals 110(1)-110(N) from the different service providers 104(1)-104(N) do not interfere with each other even if transmitted by the radio node 102 at the same time. The radio node 102 may also be configured as a shared spectrum communications system where the multiple service providers 104(1)-104(N) have a shared spectrum. In this regard, the capacity supported by the radio node 102 for the shared spectrum is split (i.e., shared) between the multiple service providers 104(1)-104(N) for providing services to the subscribers.

The radio node 102 in FIG. 1 can also be coupled to a distributed communications system (DCS), such as a distributed antenna system (DAS), such that the radio circuits 118(1)-118(N) remotely distribute the communications signals 110(1)-110(N) of the multiple service providers 104(1)-104(N) to remote units. The remote units can each include an antenna array that includes tens or even hundreds of antennas for concurrently radiating the communications signals 110(1)-110(N) to subscribers using spatial multiplexing. Herein, the spatial multiplexing is a scheme that takes advantage of the differences in RF channels between transmitting and receiving antennas to provide multiple independent streams between the transmitting and receiving antennas, thus increasing throughput by sending data over parallel streams. Accordingly, the remote units can be said to radiate the communications signals 110(1)-110(N) to subscribers based on a massive multiple-input multiple-output (M-MIMO) scheme.

The WCS 100 may be configured to operate as a 5G and/or a 5G-NR communications system. In this regard, the radio node 102 can function as a 5G or 5G-NR base station (a.k.a. eNodeB) to service the wireless client devices 106(1)-106(W). Notably, the 5G or 5G-NR wireless communications system may be implemented based on a millimeter-wave (mmWave) spectrum that can make the communications signals 110(1)-110(N) more susceptible to propagation loss and/or interference. As such, it is desirable to radiate the RF beams 120(1)-120(N) based on a desirable number of RF beams to help mitigate signal propagation loss and/or interference.

SUMMARY

Embodiments disclosed herein include coverage cluster-based beamforming in a wireless node in a wireless communications system (WCS). In a conventional beamforming system, a wireless node (e.g., base station) periodically emits multiple reference beams, each steered toward a predefined direction, to provide a blanket coverage in an intended coverage area. Contrary to providing the blanket coverage, a wireless node disclosed herein is configured to provide targeted coverage in an intended coverage area. Specifically, the wireless node is configured to dynamically group multiple coverage points (e.g., user equipment, high user density area, etc.) into multiple coverage clusters.

Accordingly, the wireless node can form and steer a respective reference beam toward each of the coverage clusters. By supporting coverage cluster-based beamforming in the wireless node, it is possible to achieve blanket coverage in the intended coverage area with a lesser number of reference beams, thus helping to reduce computational complexity and signaling overhead in the wireless node.

One exemplary embodiment of the disclosure relates to a wireless node. The wireless node includes an antenna array. The antenna array includes a plurality of antenna elements. The plurality of antenna elements is configured to emit a predetermined number of radio frequency (RF) beams toward a plurality of coverage points in a coverage area. The wireless node also includes a processing circuit. The processing circuit is configured to determine a respective clustering distance metric between each pair of the plurality of coverage points. The processing circuit is also configured to group the plurality of coverage points into a predetermined number of coverage clusters based on the respective clustering distance metric between each pair of the plurality of coverage points. Each of the predetermined number of coverage clusters includes a subset of the plurality of coverage points and receives a respective one of the predetermined number of RF beams.

An additional exemplary embodiment of the disclosure relates to a method for supporting cluster-based beamforming in a wireless node in a WCS. The method includes determining a respective clustering distance metric between each pair of a plurality of coverage points configured to receive a predetermined number of RF beams emitted from the wireless node. The method also includes grouping the plurality of coverage points into a predetermined number of coverage clusters based on the respective clustering distance metric between each pair of the plurality of coverage points. Each of the predetermined number of coverage clusters comprises a subset of the plurality of coverage points and receives a respective one of the predetermined number of RF beams.

An additional exemplary embodiment of the disclosure relates to a WCS. The WCS includes a centralized services node coupled to a service node. The WCS also includes at least one radio node coupled to the centralized services node. The WCS also includes at least one open radio access network (O-RAN) remote unit coupled to the centralized services node via a distribution unit. The WCS also includes a distributed communications system (DCS). The DCS includes a routing unit (RU) coupled to the centralized services node via a baseband unit (BBU). The DCS also includes a plurality of remote units coupled to the RU. At least one of the at least one radio node, the at least one O-RAN remote unit, and the plurality of remote units includes an antenna array. The antenna array includes a plurality of antenna elements. The plurality of antenna elements is configured to emit a respective downlink communications signal in a predetermined number of RF beams toward a plurality of coverage points in a coverage area. At least one of the at least one radio node, the at least one O-RAN remote unit, and the plurality of remote units also includes a processing circuit. The processing circuit is configured to determine a respective clustering distance metric between each pair of the plurality of coverage points. The processing circuit is also configured to group the plurality of coverage points into a predetermined number of coverage clusters based on the respective clustering distance metric between each pair of the plurality of coverage points. Each of the predetermined number of coverage clusters comprises a subset of the plurality of coverage points and receives a respective one of the predetermined number of RF beams.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 5 is a flowchart of an exemplary process that can be employed by the wireless node of FIG. 4 to support coverage cluster-based beamforming;

FIG. 11 is a partial schematic cut-away diagram of an exemplary building infrastructure in a WCS, such as the WCS of FIG. 3 that includes the wireless node of FIG. 4 for supporting coverage cluster-based beamforming;

DETAILED DESCRIPTION

Embodiments disclosed herein include coverage cluster-based beamforming in a wireless node in a wireless communications system (WCS). In a conventional beamforming system, a wireless node (e.g., base station) periodically emits multiple reference beams, each steered toward a predefined direction, to provide a blanket coverage in an intended coverage area. Contrary to providing the blanket coverage, a wireless node disclosed herein is configured to provide targeted coverage in an intended coverage area. Specifically, the wireless node is configured to dynamically group multiple coverage points (e.g., user equipment, high user density area, etc.) into multiple coverage clusters. Accordingly, the wireless node can form and steer a respective reference beam toward each of the coverage clusters. By supporting coverage cluster-based beamforming in the wireless node, it is possible to achieve blanket coverage in the intended coverage area with a lesser number of reference beams, thus helping to reduce computational complexity and signaling overhead in the wireless node.

Figure 1:
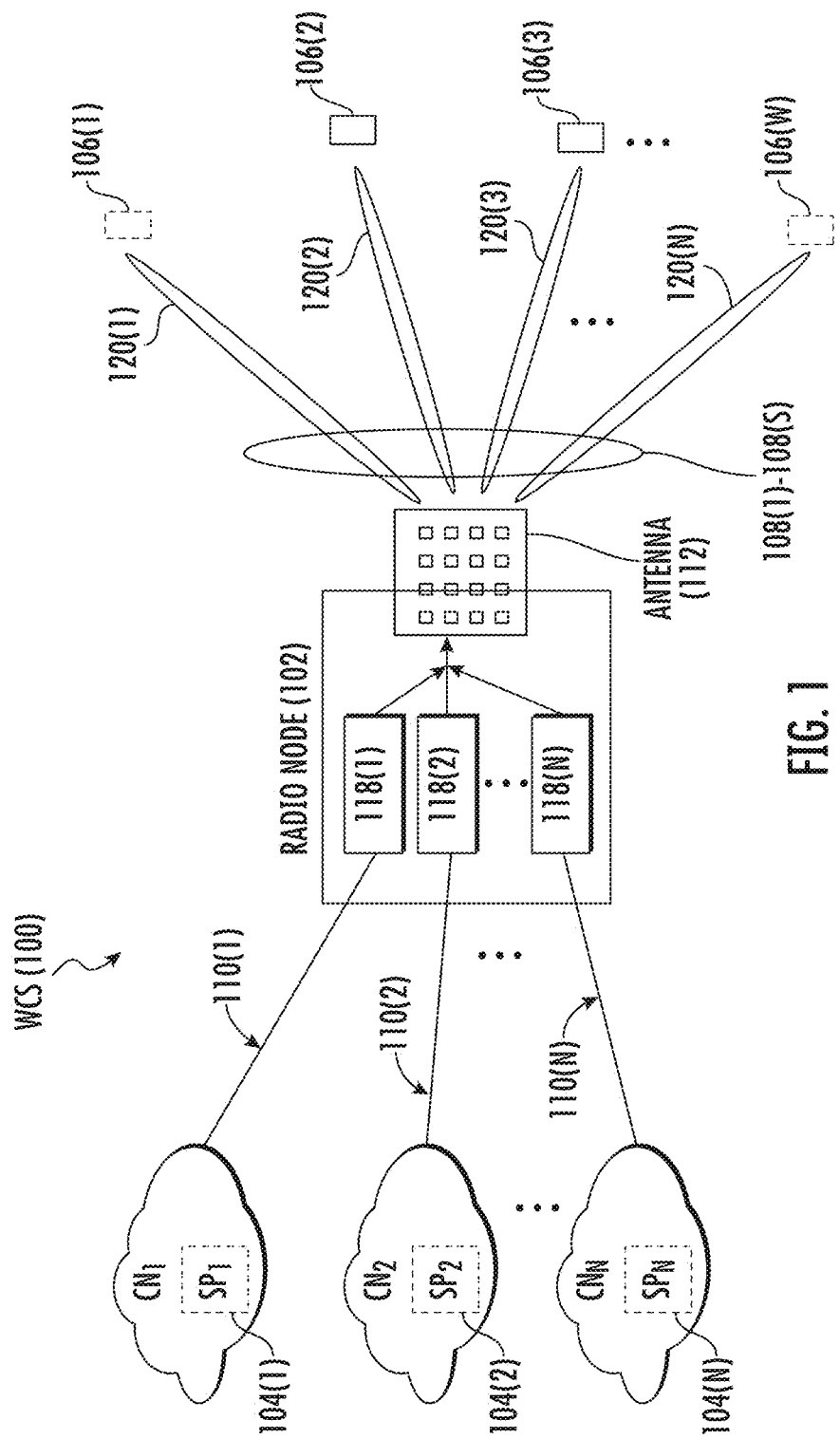
FIG. 1 is a schematic diagram of an exemplary wireless communications system (WCS), such as a distributed communications system (DCS), configured to distribute communications services to remote coverage areas.
Figure 2:
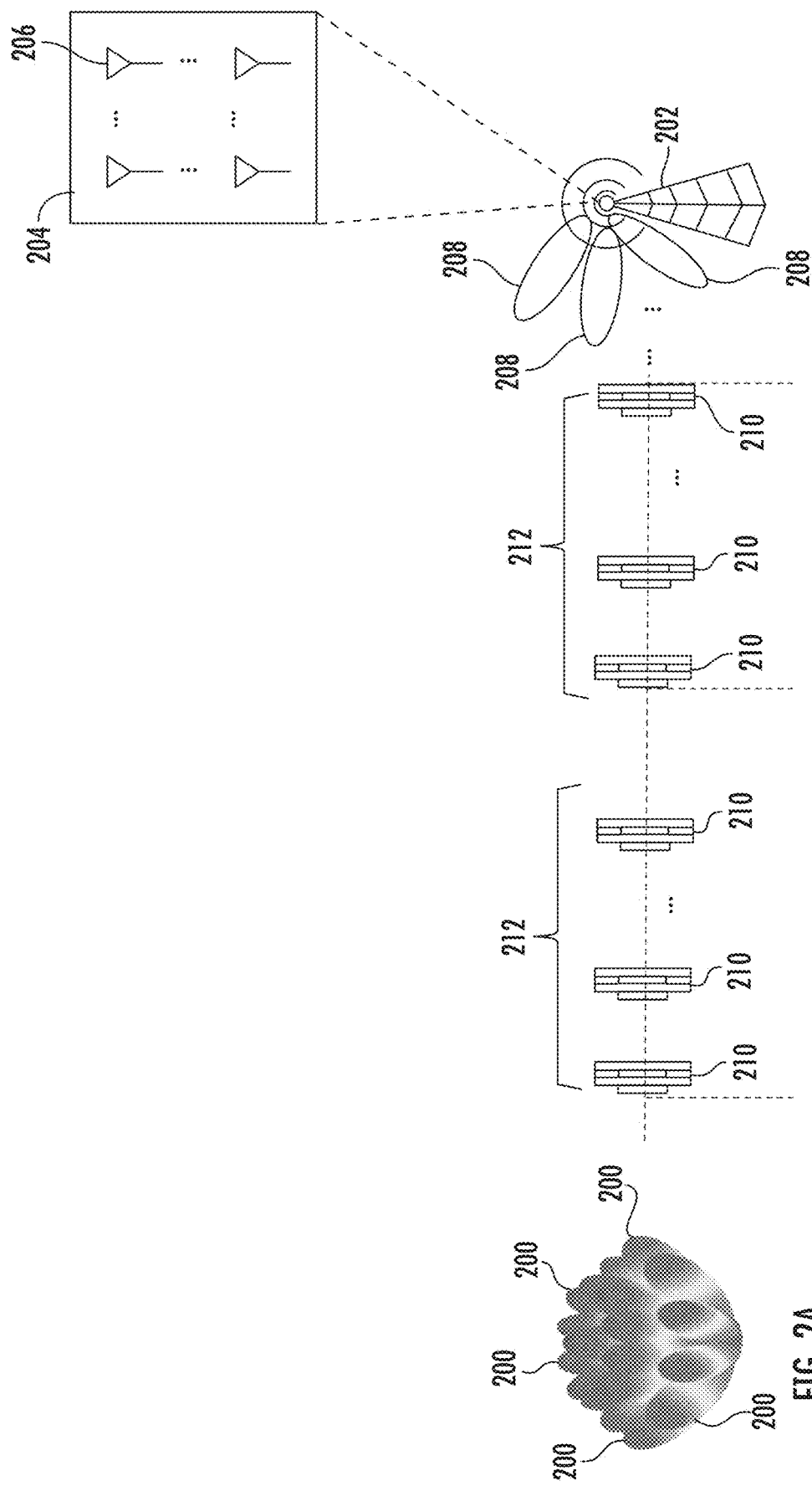
FIGS. 2A-2B are graphic diagrams providing exemplary illustrations of a number of fundamental aspects related to radio frequency (RF) beamforming.
Figure 3:
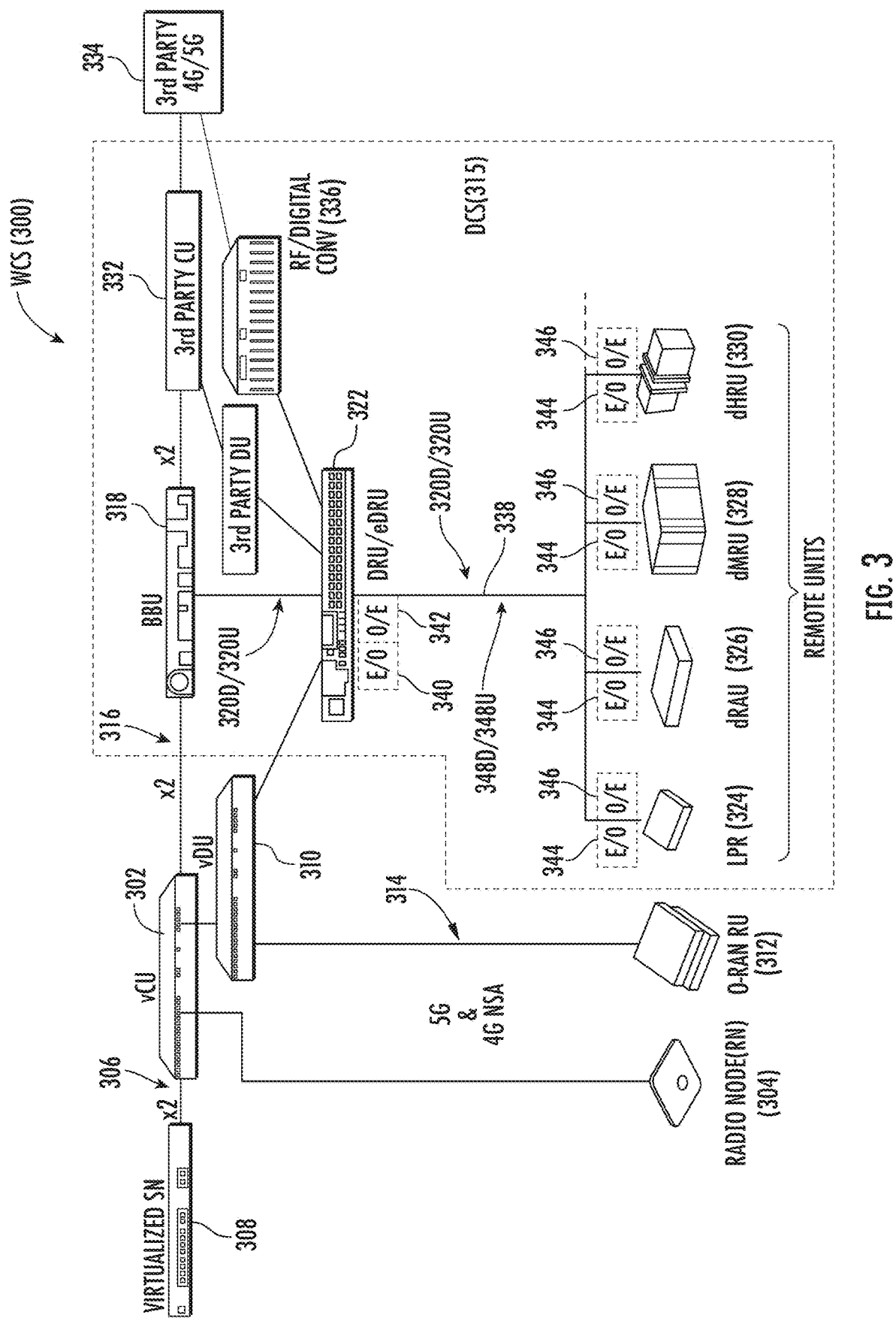
FIG. 3 is a schematic diagram of an exemplary WCS configured according to any of the embodiments disclosed herein to support coverage cluster-based beamforming in various wireless nodes.

Before discussing a wireless node of the present disclosure configured to support coverage cluster-based beamforming, starting at FIG. 3, a brief overview of a conventional beamforming system is first provided with reference to FIGS. 2A-2B to help explain some fundamental aspects related to radio frequency (RF) beamforming.

In this regard, FIGS. 2A-2B are graphic diagrams providing exemplary illustrations of fundamental aspects related to RF beamforming. In general, beamforming refers to a technique that uses multiple antenna elements to simultaneously emit an RF signal. The antenna elements are typically organized into an antenna array (e.g., 4×4, 8×8, 16×16, etc.) and separated from each other by a distance (e.g., ½ wavelength). The RF signal emitted from the antenna elements is preprocessed based on a set of complex-valued coefficients, which is commonly known as a codeword. Specifically, the codeword is physically realized through phase and/or amplitude control applied at input of the antenna elements to thereby maximize array gain in a specific direction. By applying the set of complex-valued coefficients to the RF signal, the multiple simultaneously emitted RF signals can form a radiation pattern (a.k.a. RF beam) described by gain, intensity, power, and/or electric/magnetic field values versus elevation and azimuth directions. In this regard, it can be said that each RF beam is associated with, or defined by, a respective codeword. In other words, there is a one-to-one relationship between an RF beam and a codeword. Accordingly, a list of different codewords, often referred to as a codebook, can define multiple different RF beams. As illustrated in FIG. 2A, by pre-processing the RF signal based on different codewords, it may be possible to form multiple RF beams 200 pointing to multiple directions.

Notably, the radiation pattern often includes a main lobe, where the radiation power is concentrated and close to a maximum radiated power, and one or more side lobes with lesser amounts of radiated power. Typically, a radiation direction of the main lobe determines a radiation direction of the RF beam, and a beamwidth of the RF beam is defined by a set of radiation directions of the radiation pattern wherein a radiated power is not lower than 3 dB from the maximum radiated power.

In the context of the present disclosure, the RF beams 200 are known as control beams or reference beams that enable a user device to discover a transmitting base station. Although, in theory, it is possible to increase the number of the RF beams 200 by defining more codewords, an actual number of the RF beams 200 is typically limited by a standard-defined parameter known as the synchronization signal block (SSB). FIG. 2B is a graphic diagram providing an exemplary illustration of how the SSB limits the actual number of the RF beams 200 that may be formed by a wireless node 202 (e.g., gNB) configured to operate according to the third-generation partnership project (3GPP) standard.

As shown in FIG. 2B, the wireless node 202 includes an antenna array 204 having multiple antenna elements 206. To allow any user equipment (UE) in an intended coverage area to detect the wireless node 202, the wireless node 202 is configured to periodically radiate multiple reference beams 208 (a.k.a. control beams) in different directions of the intended coverage cell. Like the RF beam 200, each of the reference beams 208 is formed based on a respective codeword as described above. The reference beams 208 are each associated with a respective one of multiple SSBs 210. Each of the SSBs 210 may include such information as a primary synchronization signal (PSS), a secondary synchronization signal (SSS), and a 5G-NR physical broadcast channel (PBCH) to enable the UE to discover the wireless node 202.

According to a conventional beamforming approach, the wireless node 202 is configured to sequentially steer the reference beams 208 toward different directions, which is often predetermined in the codewords, in the coverage area. Accordingly, a UE can sweep through the reference beams 208 to identify a candidate reference beam(s) associated with a strongest reference signal received power (RSRP). Further, the UE may decode a candidate SSB(s) associated with the identified candidate reference beam(s) to acquire such information as physical cell identification (PCI) and a PBCH demodulation reference signal (DMRS). Based on the candidate reference beam(s) reported by the UE, the wireless node 202 may pinpoint a location of the UE and subsequently steer a data-bearing RF beam toward the UE to enable data communication with the UE. The SSBs 210 may be organized into an SSB burst set 212 to be repeated periodically based on a predefined SSB burst interval. The current 3GPP standard allows a maximum of 64 SSBs to be scheduled in the SSB burst set 212. Accordingly, the wireless node 202 can radiate up to 64 reference beams 208 during each SSB burst interval.

By steering the reference beams 208 toward predetermined directions, the conventional beamforming approach aims to provide blanket coverage in the intended coverage. Although it may be advantageous to provide blanket coverage in an outdoor coverage area, the conventional beamforming approach may be less efficient in an indoor environment where UEs may be more concentrated in some areas (e.g., conference room, classroom, cafeteria, library, etc.) than others. In addition, to provide blanket coverage, the wireless node 202 may need to increase the number of the reference beams 208 and, accordingly, require more codewords in the codebook. Given that each codeword is defined by a set of complex-valued coefficients, the wireless node 202 may require more computational resources (e.g., processor, memory, etc.) to store and process more codewords and can incur additional signal overhead to emit an excessive number of the reference beams 208. Given the finite resources the wireless node 202 may have, it is possible that the wireless node 202 may not have enough time and/or resource to process and form data beams if the wireless node 202 spends too much time/resource to form the reference beams 208. As such, it is desirable to optimize the conventional beamforming approach to provide efficient coverage in an intended coverage area, such as an indoor coverage area, with reduced computational complexity and signaling overhead. In addition, the codewords used to steer the reference beams 208 may be predetermined based on an installation plan. For example, the codewords may be predefined for an installation on a ceiling, while an actual installation may be on a wall with or without mechanical constant tilt. Moreover, a specific coverage area geometry may not have been taken into consideration in the predetermined codewords. In this regard, it is also desirable to adjust the predetermined codewords in accordance with specific installation location and/or coverage area geometry.

In this regard, FIG. 3 is a schematic diagram of an exemplary WCS 300 configured according to any of the embodiments disclosed herein to support coverage cluster-based beamforming in various wireless nodes. The WCS 300 supports both legacy 4G LTE, 4G/5G non-standalone (NSA), and 5G standalone communications systems. As shown in FIG. 3, a centralized services node 302 is provided and is configured to interface with a core network to exchange communications data and distribute the communications data as radio signals to various wireless nodes. In this example, the centralized services node 302 is configured to support distributed communications services to a radio node 304 (e.g., 5G or 5G-NR gNB). Despite that only one radio node 304 is shown in FIG. 3, it should be appreciated that the WCS 300 can be configured to include additional numbers of the radio node 304, as needed.

The functions of the centralized services node 302 can be virtualized through, for example, an x2 interface 306 to another services node 308. The centralized services node 302 can also include one or more internal radio nodes that are configured to be interfaced with a distribution unit (DU) 310 to distribute communications signals to one or more open radio access network (O-RAN) remote units (RUs) 312 that are configured to be communicatively coupled through an O-RAN interface 314. The O-RAN RUs 312 are each configured to communicate downlink and uplink communications signals in a respective coverage cell.

The centralized services node 302 can also be interfaced with a distributed communications system (DCS) 315 through an x2 interface 316. Specifically, the centralized services node 302 can be interfaced with a digital baseband unit (BBU) 318 that can provide a digital signal source to the centralized services node 302. The digital BBU 318 may be configured to provide a signal source to the centralized services node 302 to provide downlink communications signals 320D to a digital routing unit (DRU) 322 as part of a digital distributed antenna system (DAS). The DRU 322 is configured to split and distribute the downlink communications signals 320D to different types of remote units, including a low-power remote unit (LPR) 324, a radio antenna unit (dRAU) 326, a mid-power remote unit (dMRU) 328, and a high-power remote unit (dHRU) 330. The DRU 322 is also configured to combine uplink communications signals 320U received from the LPR 324, the dRAU 326, the dMRU 328, and the dHRU 330 and provide the combined uplink communications signals to the digital BBU 318. The digital BBU 318 is also configured to interface with a third-party central unit 332 and/or an analog source 334 through a radio frequency (RF)/digital converter 336.

The DRU 322 may be coupled to the LPR 324, the dRAU 326, the dMRU 328, and the dHRU 330 via an optical fiber-based communications medium 338. In this regard, the DRU 322 can include a respective electrical-to-optical (E/O) converter 340 and a respective optical-to-electrical (O/E) converter 342. Likewise, each of the LPR 324, the dRAU 326, the dMRU 328, and the dHRU 330 can include a respective E/O converter 344 and a respective O/E converter 346.

The E/O converter 340 at the DRU 322 is configured to convert the downlink communications signals 320D into downlink optical communications signals 348D for distribution to the LPR 324, the dRAU 326, the dMRU 328, and the dHRU 330 via the optical fiber-based communications medium 338. The O/E converter 346 at each of the LPR 324, the dRAU 326, the dMRU 328, and the dHRU 330 is configured to convert the downlink optical communications signals 348D back to the downlink communications signals 320D. The E/O converter 344 at each of the LPR 324, the dRAU 326, the dMRU 328, and the dHRU 330 is configured to convert the uplink communications signals 320U into uplink optical communications signals 348U. The O/E converter 342 at the DRU 322 is configured to convert the uplink optical communications signals 348U back to the uplink communications signals 320U.

Figure 4:
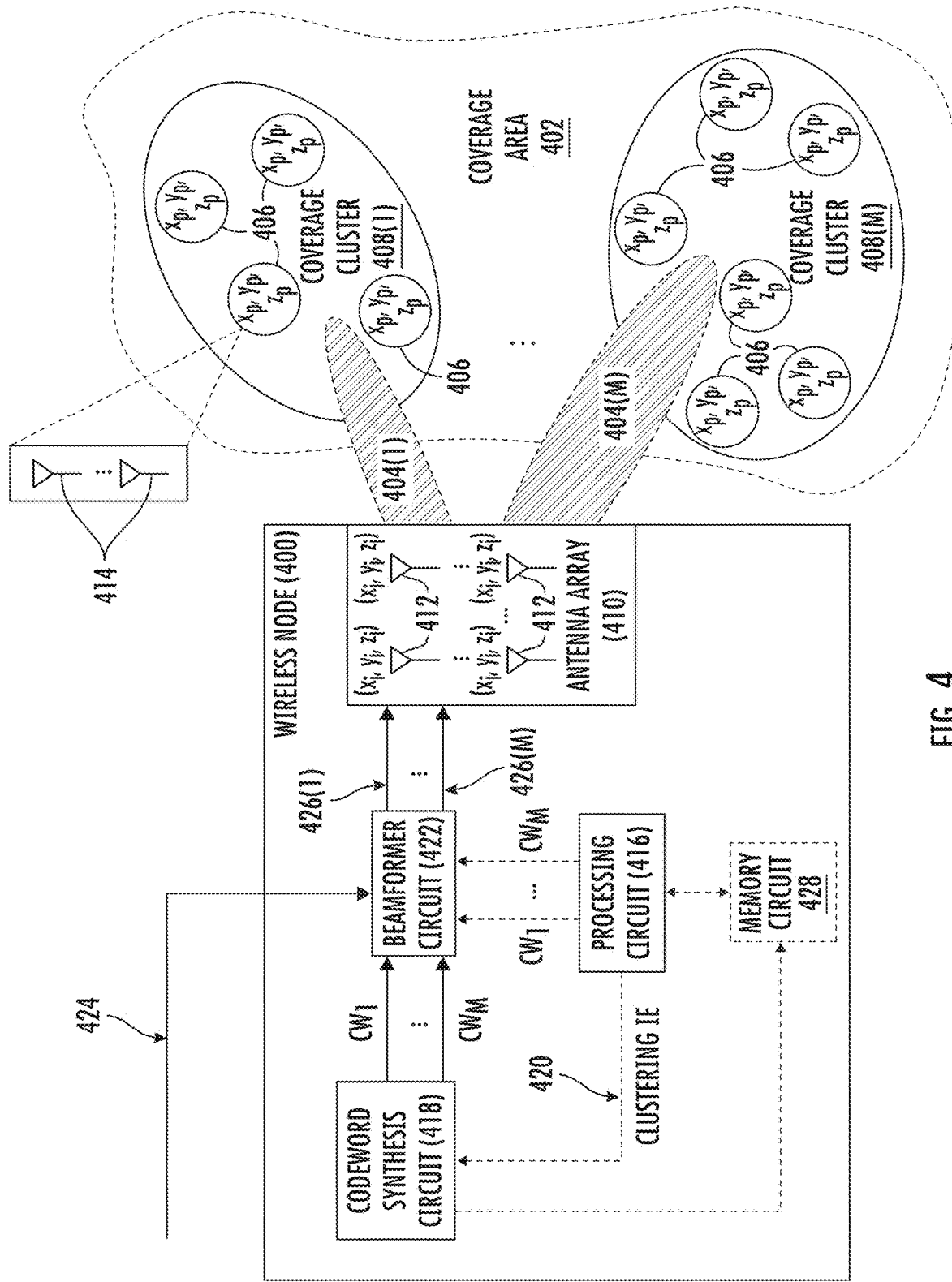
FIG. 4 is a schematic diagram of an exemplary wireless node, which can be provided in the WCS of FIG. 3 to support coverage cluster-based beamforming.

In context of the present disclosure, any of the radio node 304, the O-RAN RN 312, the LPR 324, the dRAU 326, the dMRU 328, and the dHRU 330 can function as a wireless node, as discussed with more details in FIG. 4, to support coverage cluster-based beamforming in a respective coverage area based on embodiments disclosed herein. In this regard, in the context of the present disclosure, a wireless node refers generally to the radio node 304, the O-RAN RN 312, the LPR 324, the dRAU 326, the dMRU 328, and the dHRU 330 in the WCS 300.

FIG. 4 is a schematic diagram of an exemplary wireless node 400 that can be configured according to various embodiments of the present disclosure to support coverage cluster-based beamforming in a coverage area 402. More specifically, the wireless node 400 is configured to emit a predetermined number of RF beams 404(1)-404(M) toward multiple coverage points 406 in the coverage area 402. In the context of the present disclosure, each of the coverage points 406 can correspond to a particular UE (a.k.a. actual user) (e.g., access point, hotspot, wireless repeater, small cell/femtocell base station, etc.) or a grid of users in specific area/location (a.k.a. virtual user) (e.g., conference room, classroom, cafeteria, library, etc.). In a non-limiting example, the coverage points 406 are in an indoor environment. In this regard, the grid of users can be a grid of actual or virtual users in the indoor environment. Each of the coverage points 406 is associated with a geographic position, which can be determined by a respective set of multidimensional coordinates $(x_p, y_p, z_p)$. In a non-limiting example, the multidimensional coordinates $(x_p, y_p, z_p)$ can be determined statically (e.g., based on a site map/layout plan) or dynamically (e.g., based on global positioning service and/or any other type of location services).

According to an embodiment of the present disclosure, the wireless node 400 is configured to group the coverage points 406 (e.g., via machine learning) into a same number of coverage clusters 408(1)-408(M) as the predetermined number of RF beams 404(1)-404(M) to be emitted by the wireless node 400. Each of the coverage clusters 408(1)-408(M) includes a subset of the coverage points 406 and is configured to receive a respective one of the RF beams 404(1)-404(M). By grouping the coverage points 406 into the predetermined number of coverage clusters 408(1)-408(M), the wireless node 400 can provide targeted coverage in the coverage area 402, which can be more efficient and economical compared to the blanket coverage provided by the wireless node 202 in FIG. 2B.

The wireless node 400 includes an antenna array 410, which further includes multiple antenna elements 412 (e.g., 64 antenna elements organized into 8 rows and 8 columns). Each of the antenna elements 412 is associated with a respective set of multidimensional coordinates ($x_i$, $y_i$, $z_i$). In a non-limiting example, some or all of the coverage points 406 (e.g., actual or virtual users) can also include one or more receiving antennas 414. In this regard, the wireless node 400 emits the predetermined number of RF beams 404(1)-404(M) from the antenna elements 412, and each of the coverage points 406 receives a respective one of the RF beams 404(1)-404(M) via respective receiving antennas 414.

In an embodiment, the wireless node 400 includes a processing circuit 416, which can be a digital signal processor (DSP), a field-programmable gate array (FPGA), or an application-specific integrated circuit (ASIC), as an example. As described in detail below, the processing circuit 416 determines a respective clustering distance metric d($p_1$, $p_2$) between each pair ($p_1$, $p_2$) of the coverage points 406. As described in detail below, the clustering distance metric d($p_1$, $p_2$) can be a similarity metric, as opposed to being a pure Euclidian distance on two-dimensional (2D) or three-dimensional (3D) space. Accordingly, the processing circuit 416 can group the coverage points 406 into the predetermined number of coverage clusters 408(1)-408(M).

The wireless node 400 can support coverage cluster-based beamforming based on a process. In this regard, FIG. 5 is a flowchart of an exemplary process 500 that may be employed by the wireless node 400 of FIG. 4 to support coverage cluster-based beamforming.

Herein, the processing circuit 416 is configured to first determine a respective clustering distance metric d($p_1$, $p_2$) between each pair ($p_1$, $p_2$) of the coverage points 406 that are configured to receive the predetermined number of RF beams 404(1)-404(M) emitted from the wireless node 400 (block 502). Accordingly, the processing circuit 416 can group the coverage points 406 into the predetermined number of coverage clusters 408(1)-408(M) based on the respective clustering distance metric d($p_1$, $p_2$) between each pair ($p_1$, $p_2$) of the coverage points 406 (block 504). As described above, each of the coverage clusters 408(1)-408(M) includes a subset of the coverage points 406 and receives a respective one of the predetermined number of RF beams 404(1)-404(M).

Figure 6:
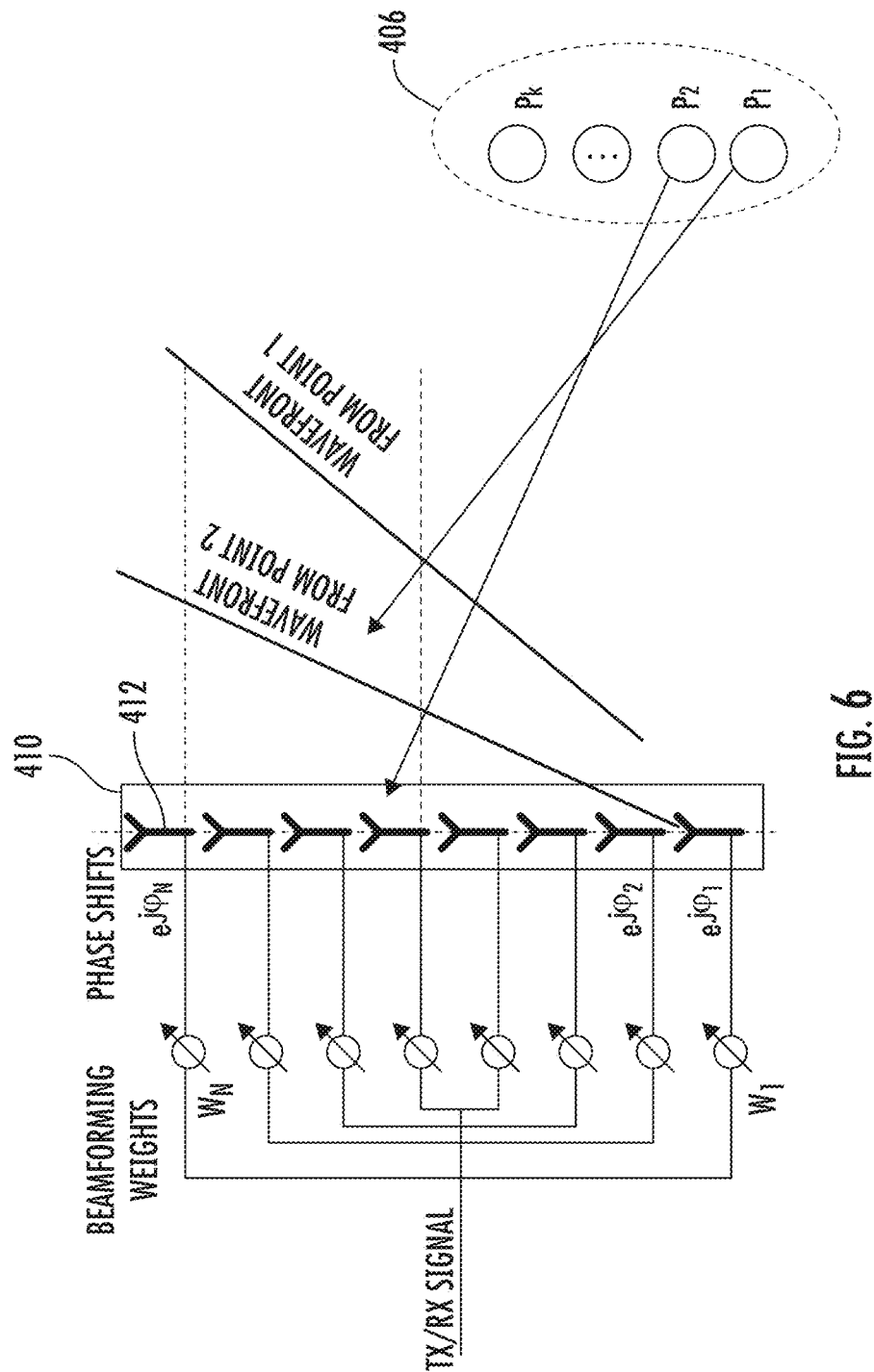
FIG. 6 is a schematic diagram providing an exemplary illustration as to how an antenna array receives/transmits a signal in a desired direction.

With reference back to FIG. 4, the processing circuit 416 is configured to calculate a steering vector for each of the coverage points 406 to compensate for a set of signal phase shifts from the antenna elements 412. Notably, for free space plane wavefront propagation, the steering vector of any of the coverage points 406 will depend primarily on geometrical positions and orientations of the coverage point 406 and the antenna elements 412. FIG. 6 is a schematic diagram providing an exemplary illustration as to how an antenna array (e.g., an 8×1 or 1×8 antenna array) receives/transmits a signal in a desired direction. Common elements between FIGS. 4 and 6 are shown therein with common element numbers and will not be re-described herein.

Herein, the set of signal phase shifts that compensate for plane wavefront tilt relative to any of the coverage points 406 can be expressed by an array factor AF($\theta_p$, $\phi_p$), as in equations (Eq. 1a-1e) below.

$$AF_{\Theta_p,\phi_p}(\Theta, \phi) = \qquad \text{(Eq. 1a)}$$

$$\sum_{i=1}^{N} \alpha_i^{for\ \Theta_p,\phi_p} e^{jk_0(x_i \sin(\Theta)\sin(\phi) + y_i \sin(\Theta)\cos(\phi) + z_i \cos(\Theta))}$$

$$\begin{pmatrix} x_p \\ y_p \\ z_p \end{pmatrix} = \begin{pmatrix} \sin(\theta_p)\sin(\phi_p) \\ \sin(\theta_p)\cos(\phi_p) \\ \cos(\theta_p) \end{pmatrix} \qquad \text{(Eq. 1b)}$$

$$\alpha_i^{for\ \Theta_p,\phi_p} = \qquad \text{(Eq. 1c)}$$

$$w_i \times conj\left(e^{-jk_0(x_i x_p + y_i y_p + z_i z_p)}\right) = w_i \times e^{jk_0(x_i x_p + y_i y_p + z_i z_p)}$$

$$\alpha_i^{for\ \Theta_p,\phi_p} = \qquad \text{(Eq. 1d)}$$

$$w_i \times e^{jk_0(x_i \sin(\theta_p)\sin(\phi_p) + y_i \sin(\theta_p)\cos(\phi_p) + z_i \cos(\theta_p))} = w_i \times e^{j\varphi_i^{for\ p}}$$

Set of $\alpha_i^{for\ \Theta_p,\phi_p}$ is designed to have maximum array factor in direction of $\Theta_p$, $\phi_p$ $$AF_{\Theta_p,\phi_p} = (\Theta = \Theta_p, \phi = \phi_p) \geq AF_{\Theta_p,\phi_p}(\Theta, \phi) \qquad \text{(Eq. 1e)}$$

In the equation (Eq. 1.a), N represents a total number of the antenna elements 412, ($x_p$, $y_p$, $z_p$) represents a unit vector pointing at the geometrical position of specific coverage point p among the coverage points 406 toward which a respective one of the RF beams 404(1)-404(M) is steered, ($x_i$, $y_i$, $z_i$) represents a geometrical position of an antenna element i (1≤i≤N) among the antenna elements 412, $\alpha_i^{for\ \Theta_p,\phi_p}$ represents complex control coefficient with $k_0(x_i \sin(\theta_p) \sin(\phi_p) + y_i \sin(\theta_p) \cos(\phi_p) + z_i \cos(\theta_p))$ phase shifts compensating for a channel induced phase shift to the coverage point p, $\theta_p$, $\phi_p$ represents azimuth and elevation angles toward specific coverage point p. Input parameters $\Theta$, $\phi$ describes direction from which an array gain can be learned. The complex control coefficients $\alpha_i^{for\ \Theta_p,\phi_p}$ are designed to steer the beam in direction of $\theta_p$, $\phi_p$, therefore the maximum of Eq. 1.a will be achieved for $\Theta=\Theta_p$, $\phi=\phi_p$, when for any other direction the gain will be smaller as described by Eq 1e. By calculating Eq 1.a for all combinations of 0≤$\Theta$≤π and 0≤$\phi$≤2π, it is possible to plot 3D radiation pattern of a beam. If control coefficients are set according to Eq. 1.d with $w_i$=1, it is possible to get the steered beam with maximum in direction of $\Theta_p$, $\phi_p$. Vector of steering phases $\overline{\varphi}=\{\varphi_1^{for\ p}, \varphi_1^{for\ p}, \ldots, \varphi_N^{for\ p}\}$ is part of data for p point.

In addition to steering phases, the three-dimensional (3D) geometric position in a space and a power/path loss of each of the coverage points 406 must also be taken into consideration. In an embodiment, the 3D geometric position and/or power/path loss information may be collected experimentally or via such modeling/simulation models as the Monte-Carlo with quasi deterministic channel model or according to free space path loss calculation.

Accordingly, each of the coverage points 406 will be described by a composite coordinate of ($N_H$, $x_p$, $y_p$, $z_p$, $G_p$), in case of single antenna of a virtual user (coverage point) those coordinates are ($\varphi_1^{for\ p}$, $\varphi_1^{for\ p}$, ..., $\varphi_N^{for\ p}$, $x_p$, $y_p$, $z_p$, $G_p$). Herein, $N_H$ represents a total number of channel paths between the antenna array 410 and a coverage point p among the coverage points 406, ($x_p$, $y_p$, $z_p$) represents the 3D geometric position of the coverage point p, and $G_p$ represents logarithm power/path loss/gain at the coverage point p when steering is applied. In other words, each of the coverage points 406 will be described by a ($N_H$+4) composite coordinate.

Figure 7:
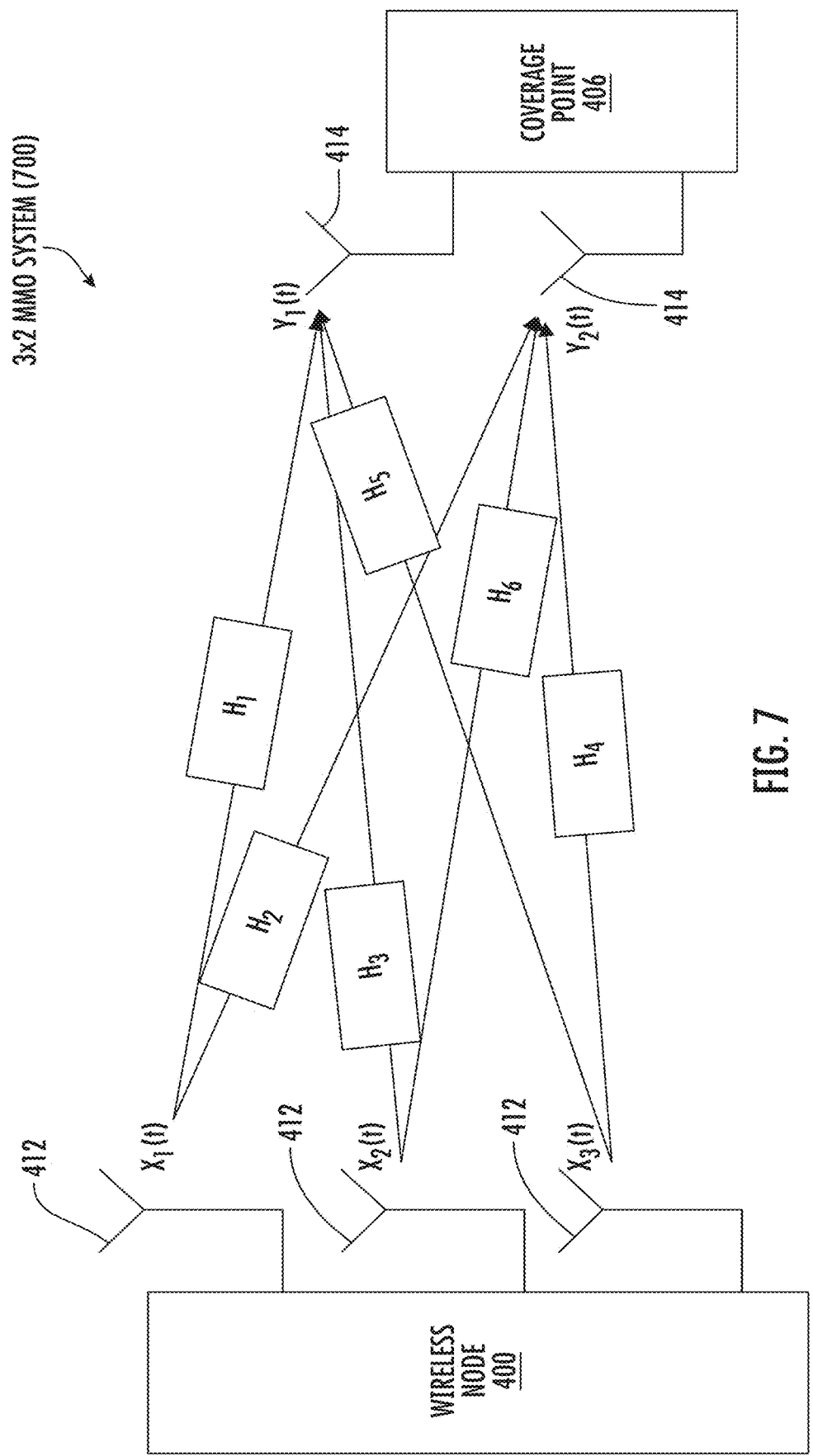
FIG. 7 is a schematic diagram providing an exemplary illustration of channel paths in a three-by-two (3×2) multiple-input multiple-output (MIMO) system.

Notably, the total number of channel paths $N_H$ will depend on a total number of the antenna elements 412 provided in the antenna array 410 and a total number of the receiving antennas 414 provided at each of the coverage points 406. As an example, FIG. 7 is a schematic diagram providing an exemplary illustration of channel paths in a three-by-two (3×2) multiple-input multiple-output (MIMO) system 700. Common elements between FIGS. 4 and 7 are shown therein with common element numbers and will not be re-described herein.

In this example, it is assumed that the wireless node 400 includes three antenna elements 412 and the coverage point 406 includes two receiving antennas 414. As such, there are a total of six channel paths $H_1$-$H_6$ between the wireless node 400 and the coverage point 406. Accordingly, the total number of channel paths $N_H$=6.

If only one receiving antenna 414 is provided at the coverage point 406, the total number of channel paths $N_H$ will then correspond to the total number of antenna elements 412 over all polarizations. In this regard, the $N_H$ provides the steering phase dimension in the ($N_H$+4) composite coordinate, which may be calculated as an offset relative to the channel path $H_1$, as shown in equation (Eq. 2) below.

$$\varphi_k = \arg(H_k) - \arg(H_1) \quad \text{(Eq. 2)}$$

In the equation (Eq. 2), k represents a path index, which is between 1 and 6 ($1 \leq k \leq 6$) in the example of FIG. 7. In case more than one receiving antenna 414 is provided at the coverage point 406, the initial phase shift and steering of the receiving antennas 414 should also be an offset relative to the channel path $H_1$.

With reference back to FIG. 4, after calculating the array factor $AF(\theta_p, \phi_p)$ for each of the coverage points 406, the processing circuit 416 is further configured to determine a respective clustering similarity distance metric $d(p_1, p_2)$ between each pair $(p_1, p_2)$ of the coverage points 406. In a non-limiting example, the clustering similarity distance metric $d(p_1, p_2)$ between each pair $(p_1, p_2)$ of the coverage points 406 can be a weighted Gower distance metric $d_{weightedGower}(p_1, p_2)$, as shown in equation (Eq. 3) below.

$$d_{weightedGower}(p_1, p_2) = w_1 \frac{d_\varphi(p_1, p_2)}{\max\{d_\varphi(p_1, p_2)\}} + w_2 \frac{d_{X,Y,Z}(p_1, p_2)}{\max\{d_{X,Y,Z}(p_1, p_2)\}} + w_3 \frac{G_1 - G_2}{\max\{G_i\} - \min\{G_i\}} \quad \text{(Eq. 3)}$$

In the equation (Eq. 3), $w_1$ represents a weight for the set of phase shifts impact on similarity metric, $w_2$ represents a weight for the 3D geometric position in space impact, and $w_3$ represents a weight of the power/path loss/gain impact, $d_\varphi(p_1, p_2)$ a distance between two sets of phase shifts, and $d_{X,Y,Z}(p_1, p_2)$ represents Euclidian distance between geometric locations. According to an embodiment of the present disclosure, $d_\varphi(p_1, p_2)$ and $d_{X,Y,Z}(p_1, p_2)$ may be computed based on equations (Eq. 4 and 5), respectively. Embodiments disclosed herein are not limited by using only Eq. 4 method to take into account phase difference, included here for example only, the same regarding Eq. 5 and Eq. 3.

$$d_\varphi(p_1, p_2) = \max_i \{d_{vect}(p_1[\varphi_i], p_2[\varphi_i])\} \quad \text{(Eq. 4)}$$

$$d_{vert}(p_1[\varphi_i], p_2[\varphi_i]) = |e^{jp_1[\varphi_i]} - e^{jp_2[\varphi_i]}|$$

$$d_{X,Y,Z}(p_1, p_2) = \sqrt{(p_1[X] - p_2[X])^2 + (p_1[Y] - p_2[Y])^2 + (p_1[Z] - p_2[Z])^2} \quad \text{(Eq. 5)}$$

In the equations (Eq. 4 and 5), $p_1$ and $p_2$ represent any two of the coverage points 406, for which dissimilarity is evaluated. Variables in square brackets [ ], either the steering phase $\varphi_i$, the 3D geometric location X,Y,Z, or the power/path loss/gain G, correspond to captured signal real number property of a given coverage point $p_1$ or $p_2$.

Figure 8A:
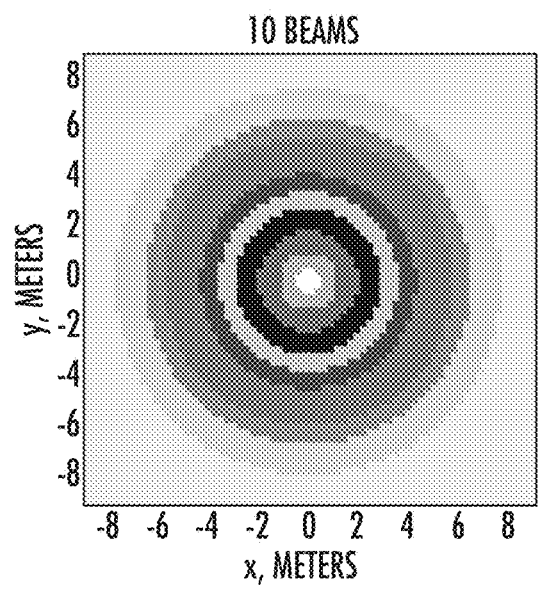
FIGS. 8A-8D are graphic diagrams providing an exemplary illustration as to how different similarity metrics parameterization can impact coverage clustering outcomes.
Figure 8B:
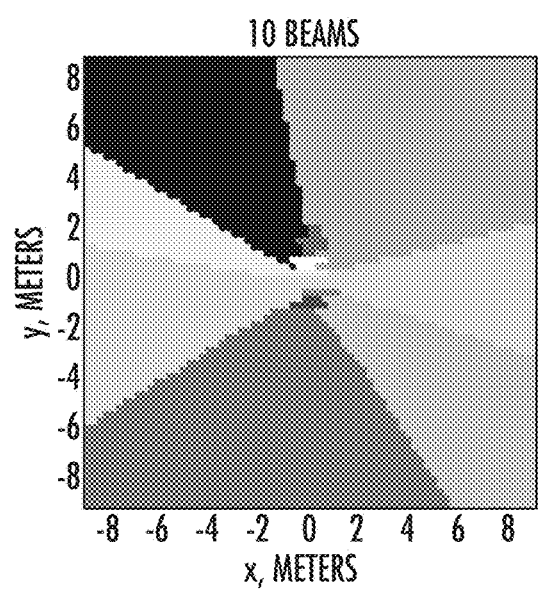
Figure 8C:
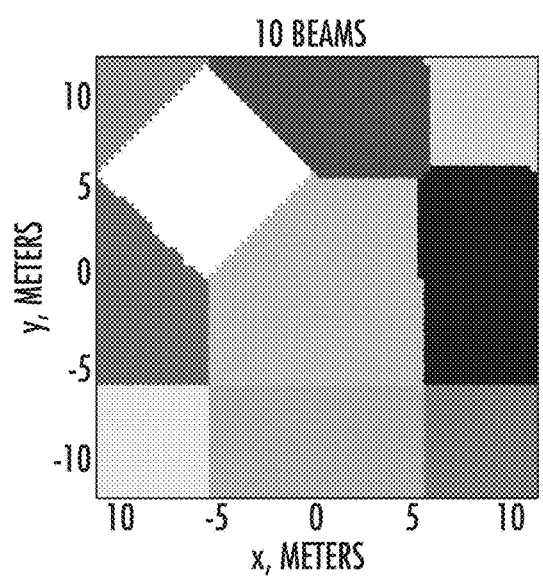

FIGS. 8A-8D are graphic diagrams providing an exemplary illustration as to how different weights can impact coverage clustering outcomes. Specifically, FIG. 8A illustrates clustering outcomes for square coverage area when weights $w_1$ and $w_2$ are set to zero, FIG. 8B illustrates a radiation pattern when weights $w_2$ and $w_3$ are set to zero, and FIG. 8C illustrates clustering outcomes for square coverage area when weights $w_1$ and $w_3$ are set to zero. Notably, if weight $w_2$ is set to zero, there can be many non-connected coverage sub-areas. Too many such non-connected coverage sub-areas can introduce beam management complications and additional signaling overhead. The weight $w_3$, on the other hand, can help introduce premium service areas wherein power/path loss is low.

Figure 8D:
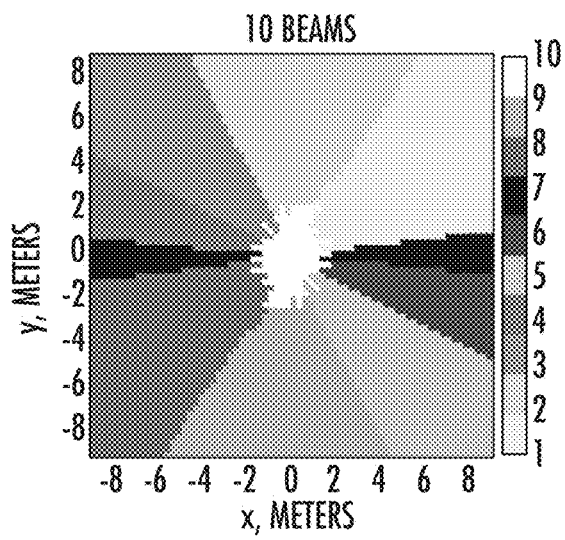
Figure 9:
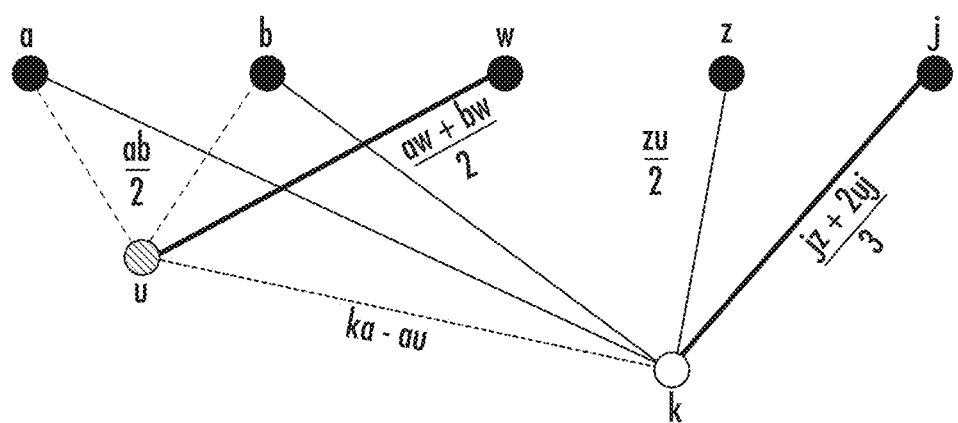
FIG. 9 is a graphic diagram illustrating a hierarchical clustering tree in an agglomerative unweighted pair group method with arithmetic mean (UPGMA) algorithm.

The coverage clustering in FIG. 8D is performed based on an agglomerative unweighted pair group method with arithmetic mean (UPGMA) algorithm. FIG. 9 is a graphic diagram illustrating a hierarchical clustering tree 900 in the UPGMA algorithm.

Given the input pairwise distance matrix D between each point of a dataset, the minimum distance elements ('a' and 'b') from the matrix D is merged into a new node 'u.' The matrix D is then updated by removing nodes 'a' and 'b' and inserting the node 'u.' The distances au=bu=ab/2. The distance between 'u' to another point 'w' from the original dataset is defined as uw=(aw+bw)/2. When merging the next element 'z' into node 'u' (assuming zu is now the minimum value in the matrix D), the new node 'k' is created with kz=ka=kb=zu/2. This equality ensures node 'k' is the same distance from all nodes within 'k.' Notably, 'k' cannot be used as a centroid, because 'k' is an artificial node without a true coordinate. In a non-limiting example, a centroid is a coverage point that can be used to represent a cluster. Specifically, the centroid is the coverage point that is close or good enough in average to other coverage points in the same cluster. The distance between nodes 'u' and 'k' can be deducted as uk=ka−au. The distance to some arbitrary node 'j' is according to a number of elements within 'j' and 'k.' For example, if 'j' is the point from the original dataset, then kj=(ju*2+jz)/3, where 2 is the number of nodes within 'u' and 3 is total number of nodes within 'j' and 'u.' The number of original nodes is kept in memory as a weight for all merge-nodes and will be 3 for node 'k' for further merges. This allows keeping only 'recent' distances in memory while ensuring equal weights of initial distances: kj=(jz+ja+jb)/3.

With reference back to FIG. 4, in one embodiment, the processing circuit 416 can group the coverage points 406 into the coverage clusters 408(1)-408(M) based on the hierarchical clustering tree 900 of FIG. 9. Herein, the hierarchical clustering tree 900 with corresponding distances is referred to as a dendrogram, wherein distances to each node are ordered. To define the coverage clusters 408(1)-408(M) from the hierarchical clustering tree 900, the hierarchical clustering tree 900 is cut at the point where a number of leaves corresponds to the predetermined number of coverage clusters 408(1)-408(M), and then collects all the points down the branches of each leaf.

The UPGMA algorithms may use various 'linkages,' such as single linkage (clusters merged based on minimum distance between elements), complete linkage (maximum distance), average linkage (UPGMA and weighted PGMA), Ward linkage (minimum sum square distance), and/or arbitrary cost functions. The divisive clustering algorithms in principle may be more effective performance-wise for beamforming codebooks because the clustering process could be stopped as soon as the required number of clusters (beams) is obtained. To obtain non-naive results, divisive clustering methods become more complicated and may end up being very similar in complexity to agglomerative algorithms. There is also a faster Potential-based hierarchical clustering (PHA), which results in a linkage measure somewhere in-between single linkage and average linkage. Another clustering algorithm is shrinkage clustering, which is based on formulating the clustering problem as a system of linear equations involving binary variables and relaxation of this problem to continuous variables. Overlapping clustering methods could be applied to allow overlapping beams.

The wireless node 400 may include a codeword synthesis circuit 418 configured to generate a predetermined number of codewords $CW_1$-$CW_M$, each corresponding to a respective one of the predetermined number of the RF beams 404(1)-404(M) and includes N (representing a total number of the antenna elements 412) complex-valued coefficients. In this regard, the processing circuit 416 may provide a clustering information element (IE) 420 to the codeword synthesis circuit 418 for generating the codewords $CW_1$-$CW_M$. In a non-limiting example, the clustering IE 420 can include such information as the coverage clusters 408(1)-408(M) and/or the clustering similarity distance metric $d(p_1, p_2)$ between each pair of the coverage points 406.

The wireless node 400 can further include a beamformer circuit 422. The beamformer circuit 422 receives an RF signal 424 (e.g., from the centralized services node 302, the DU 310, or the DRU 322). Accordingly, the beamformer circuit 422 can process the received RF signal 424 based on the codewords $CW_1$-$CW_M$ to generate multiple beamforming RF signals 426(1)-426(M), respectively. The beamformer circuit 422 then provides each of the beamforming RF signals 426(1)-426(M) to the antenna elements 412 to thereby form the RF beams 404(1)-404(M).

Alternative to grouping the coverage points 406 into the coverage clusters 408(1)-408(M) based on the hierarchical clustering tree 900, the processing circuit 416 may also be configured to grouping the coverage points 406 into the coverage clusters 408(1)-408(M) based on a K-means clustering algorithm, which can group the coverage points 406 into the coverage clusters 408(1)-408(M) quickly and generate the codewords $CW_1$-$CW_M$ as well. In this regard, the processing circuit 416 can bypass the codeword synthesis circuit 418 and provide the codewords $CW_1$-$CW_M$ directly to the beamformer circuit 422.

The K-means clustering algorithm includes two steps, namely assignment and update. Each of the coverage clusters 408(1)-408(M) is first given an initial mean or centroid location. Accordingly, each of the coverage points 406 can be assigned to one of the coverage clusters 408(1)-408(M) with a smallest distance to the initial mean or centroid location of the assigned coverage cluster. Then, the centroid of each of the coverage clusters 408(1)-408(M) is recalculated according to the subset of the coverage points 406 being assigned to the coverage cluster.

These two steps are repeated until convergence, often within just several iterations. Spectral clustering algorithms, which include K-means as an internal part of the algorithm may also be used. Plain K-means algorithm clustering outputs significantly depend on the method of clusters initialization. Initialization options include random initialization, uniform initialization, and K-means++ initialization. A good initialization option used in the present disclosure is an incremental farthest neighbor search procedure. To optimize the number of the coverage clusters 408(1)-408M) together with grouping the coverage points 406 into the coverage clusters 408(1)-408(M), algorithms such as X-means or DB-scan may be applied. Various options of initialization for K-means the algorithm may lead to very different results, whereas in hierarchical clustering there is usually no random initializations. To evaluate the clustering quality, various measures are often used, such as Davies-Bouldin Index and Dunn index to assess if clusters are well-spaced and dense, and Silhouette coefficient to assess how well each individual coverage point 406 is assigned.

Notably, the coverage clusters 408(1)-408(M) as initially formed may be imbalanced in the sense that some of the coverage clusters 408(1)-408(M) may be assigned with much more of the coverage points 406 than others. From a beam management point of view, if no information regarding user density per area is known, it is desirable that each of the RF beams 404(1)-404(M) is formed to cover a similar-sized sub-area. As such, it may be desirable to re-size the coverage clusters 408(1)-408(M) such that none of the coverage clusters 408(1)-408(M) is over-sized or under-sized. In a non-limiting example, the coverage clusters 408(1)-408(M) can each include a similar number of the coverage points 406. In another non-limiting example, the coverage clusters 408(1)-408(M) can each include a number of the coverage points 406 that fall within a range of minimum and maximum number of coverage points.

Figure 10:
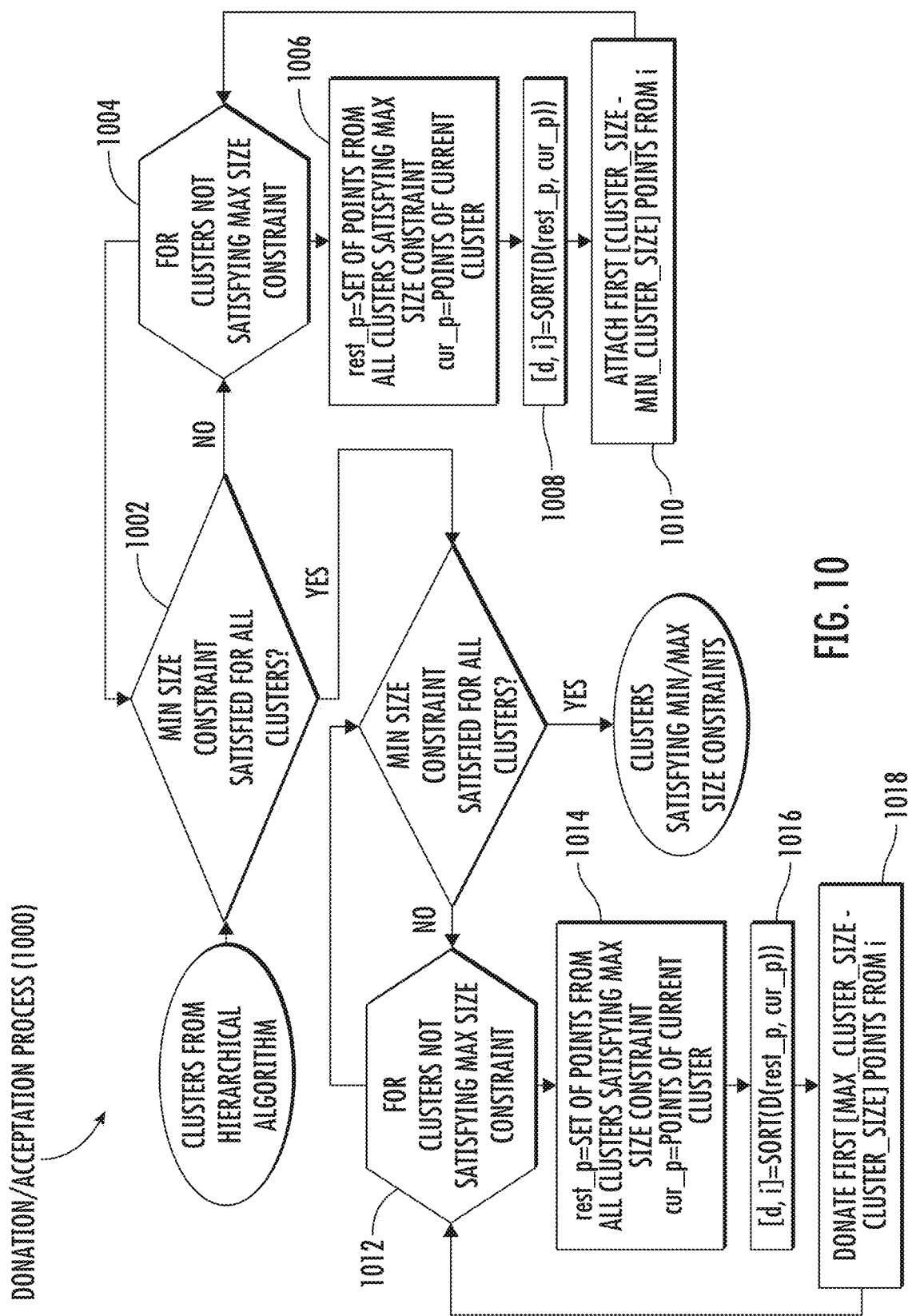
FIG. 10 is a flowchart of an exemplary donation/acceptation process that can be employed by the wireless node of FIG. 4 to re-size one or more coverage clusters formed according to the process of FIG. 5 to prevent over-sized or under-sized coverage clusters.
Figure 1:
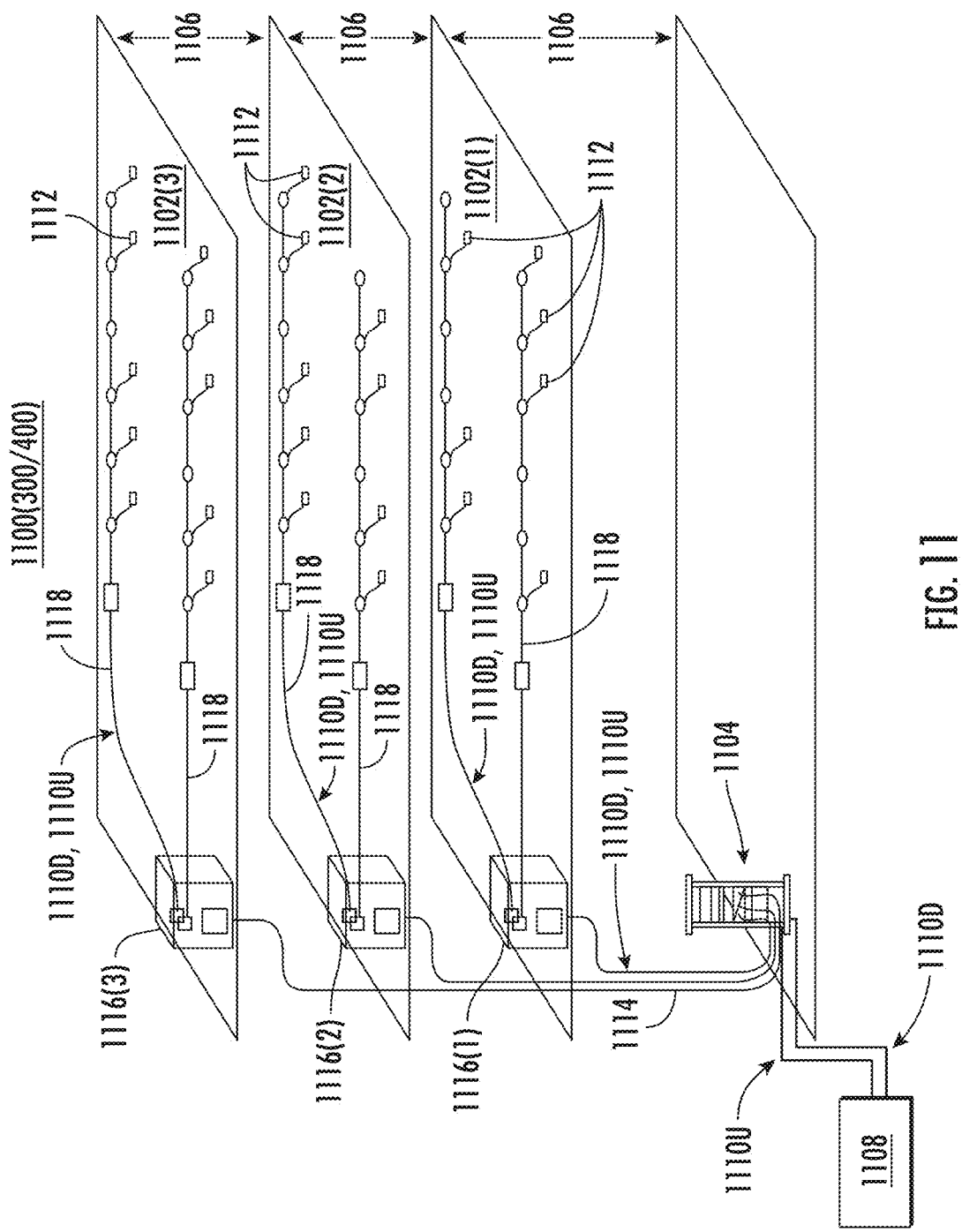

There exist several solutions for limiting the coverage cluster size within a K-means clustering algorithm, such as described in and within the hierarchical clustering algorithms. In an embodiment, coverage cluster size constraints are included as an additional post-clustering process. FIG. 10 is a flowchart of an exemplary donation/acceptance process 1000 that can be employed by the processing circuit 416 in FIG. 4 to re-balance the coverage clusters 408(1)-408(M).

In general, the donation/acceptance process 1000 includes two steps to equalize sizes of coverage clusters 408(1)-408(M). In a first step, the coverage points 406 are donated to those coverage clusters not satisfying a minimum size constraint from a neighboring coverage cluster that over-satisfies the minimal size constraint. In a second step, the coverage points 406 are taken from coverage clusters not satisfying a maximum size constraint and given to coverage clusters that will still satisfy the maximum size constraint.

As shown in FIG. 10, the processing circuit 416 first identifies and processes some of the coverage clusters 408(1)-408(M) that do not satisfy the minimum size constraints (block 1002). If a coverage cluster does not satisfy the minimum size constraint, find all points from other coverage clusters satisfying the minimum size constraints 'rest_points' (block 1004), compute distances between points in current cluster 'points_current' and 'rest_points' (block 1006), sort these distances (block 1008), attach closest [cluster_size-min_cluster_size] points to current cluster (block 1010). Points can be retrieved from any cluster satisfying the minimum size constraints. The step is repeated until all the coverage clusters 408(1)-408(M) satisfy the minimum size constraint.

Next, the processing circuit 416 identifies and process some of the coverage clusters 408(1)-408(M) that do not satisfy the maximum size constraints. If a coverage cluster does not satisfy the maximum size constraint (block 1012), the processing circuit 416 identifies and extracts the coverage points that are closest to some other coverage points in other coverage clusters satisfying the maximum size constraints (blocks 1014, 1016, 1018). Coverage points are extracted until coverage cluster size constraint is satisfied. The step is repeated until all the coverage clusters 408(1)-408(M) satisfy the maximum size constraint.

With reference back to FIG. 4, the coverage cluster-based beamforming as supported by the wireless node 400 can be used in a variety of applications. First, the embodiments described herein provide a codebook generation method for a deployed wireless node 400, where steering phases for each of the coverage points 406 are optimized for maximum directivity gain and recorded in a memory circuit 428 (e.g., by means of channel sounding and then computing the codewords $CW_1$-$CW_M$ using any of the algorithms described herein).

Secondly, the embodiments described herein can lead to determination of an optimal number of the RF beams 404(1)-404(M). Given some optimization of cost-function, which defines a UEs throughput given received powers of all potential UE positions and signaling overhead penalty due to control messages exchange feedback, it is possible to analyze such cost-function improvement trends with an increasing number of beams (i.e., by employing the 'elbow law') and determine such a number of RF beams, after which the performance improvement becomes negligible. The most effective method for this purpose is a hierarchical clustering algorithm because it does not require many re-computations when the number of the coverage clusters 408(1)-408(M) is changed.

In addition, the embodiments described herein may be applied to obtain the codewords CW1-CWM instantly (e.g., with the K-means clustering algorithm). In a non-limiting example, the K-means clustering algorithm refers to an approach whereby a centroid of a coverage cluster is used for determining a codeword for the coverage cluster. Furthermore, the embodiments described herein may also bring the following benefits:

The embodiments disclosed herein allow the codewords $CW_1$-$CW_M$ to be generated for arbitrary area layouts.

The embodiments disclosed herein are advantageous for any coverage area geometry, including but not limited to non-square planar array M×N, for directions that are set according to a dimension with a smaller number of antenna elements where the steering beams are naturally wider, while along a dimension with a larger number of elements the steering beams are naturally narrower. The coverage clusters 408(1)-408(M) formed according to embodiments disclosed herein automatically result in wider area clusters in directions along which the number of elements is smaller and vice versa (e.g., clustering accounts for array geometry).

The embodiments disclosed herein can be expended to consider polarization of electromagnetic waves including channel impact and designed antenna polarization. One of possible approaches is by treating orthogonally polarized antenna elements as separate elements, and assuming that each of the codewords $CW_1$-$CW_M$ is designed as a codeword for dual-polarization array, with two polarizations having their own control coefficients.

The embodiments disclosed herein can be expanded for deployments based on and/or including reflecting devices to reach blocked areas. In such cases, codebook design will take into account the strong reflected signal propagation path together with the line-of-sight path for clustering. To improve coverage of such areas one of the solutions is to apply passive reflectary arrays (the reflective surfaces), which allow artificially introducing a line of sight-like channel with help of line-of-sight channels between RU and surface before reflection and surface and UE after reflection.

The embodiments disclosed herein can tolerate antenna array imperfections, including antenna element directivity imperfections, such as mutual coupling that are included with the help of path loss dimension according to distance and/or channel.

The embodiments disclosed herein also consider antenna array tilts that can impact clustering solution (i.e., due to weak radiation in extreme angles) and, thus, can be applicable to any antenna array orientation.

The embodiments disclosed herein allow UE antennas to be arrayed antennas with, for example, dominant orientation (e.g., assumption of transmitting signals only when UE arrays are oriented horizontally parallel to the ground plane). Proposed clustering can be extended to UE arrays by increasing dimensionality of phases set in data points. The codebooks generated as centroids of K-means clustering algorithm are pairs of codebooks corresponding to RU and UE with one-to-one correspondence of RU codeword and UE codeword.

The embodiments disclosed herein can be tuned to have discontinued clusters, i.e., a cluster translated to a beam that covers several non-connected sub-areas. It is noted that utilization of such multi-region beams is beneficial to be included in considerations of trade-off between codebook size vs signal-to-noise ratio (SNR). Compared to geometrical position/orientation-only clustering, clustering over a multidimensional data may result in dual-, triple-, or multiple-area regions solutions for beamforming codewords, which can be beneficial in cases where high received power is easy to deliver along several directions at the same time and such directions are a minority of points.

The embodiments disclosed herein, are not restricted to single cell, and can be expanded to multicell, by adding additional dimensions of phase shifts and path gains to each of the test point coordinates according to the number of wireless nodes.

The WCS 300 of FIG. 3, which can include the wireless node 400 in FIG. 4, can be provided in an indoor environment as illustrated in FIG. 11. FIG. 11 is a partial schematic cut-away diagram of an exemplary building infrastructure 1100 in a WCS, such as the WCS 300 of FIG. 3 that includes the wireless node 400 of FIG. 4 for supporting coverage cluster-based beamforming. The building infrastructure 1100 in this embodiment includes a first (ground) floor 1102(1), a second floor 1102(2), and a third floor 1102(3). The floors 1102(1)-1102(3) are serviced by a central unit 1104 to provide antenna coverage areas 1106 in the building infrastructure 1100. The central unit 1104 is communicatively coupled to a base station 1108 to receive downlink communications signals 1110D from the base station 1108. The central unit 1104 is communicatively coupled to a plurality of remote units 1112 to distribute the downlink communications signals 1110D to the remote units 1112 and to receive uplink communications signals 1110U from the remote units 1112, as previously discussed above. The downlink communications signals 1110D and the uplink communications signals 1110U communicated between the central unit 1104 and the remote units 1112 are carried over a riser cable 1114. The riser cable 1114 may be routed through interconnect units (ICUs) 1116(1)-1116(3) dedicated to each of the floors 1102(1)-1102(3) that route the downlink communications signals 1110D and the uplink communications signals 1110U to the remote units 1112 and also provide power to the remote units 1112 via array cables 1118.

Figure 12:
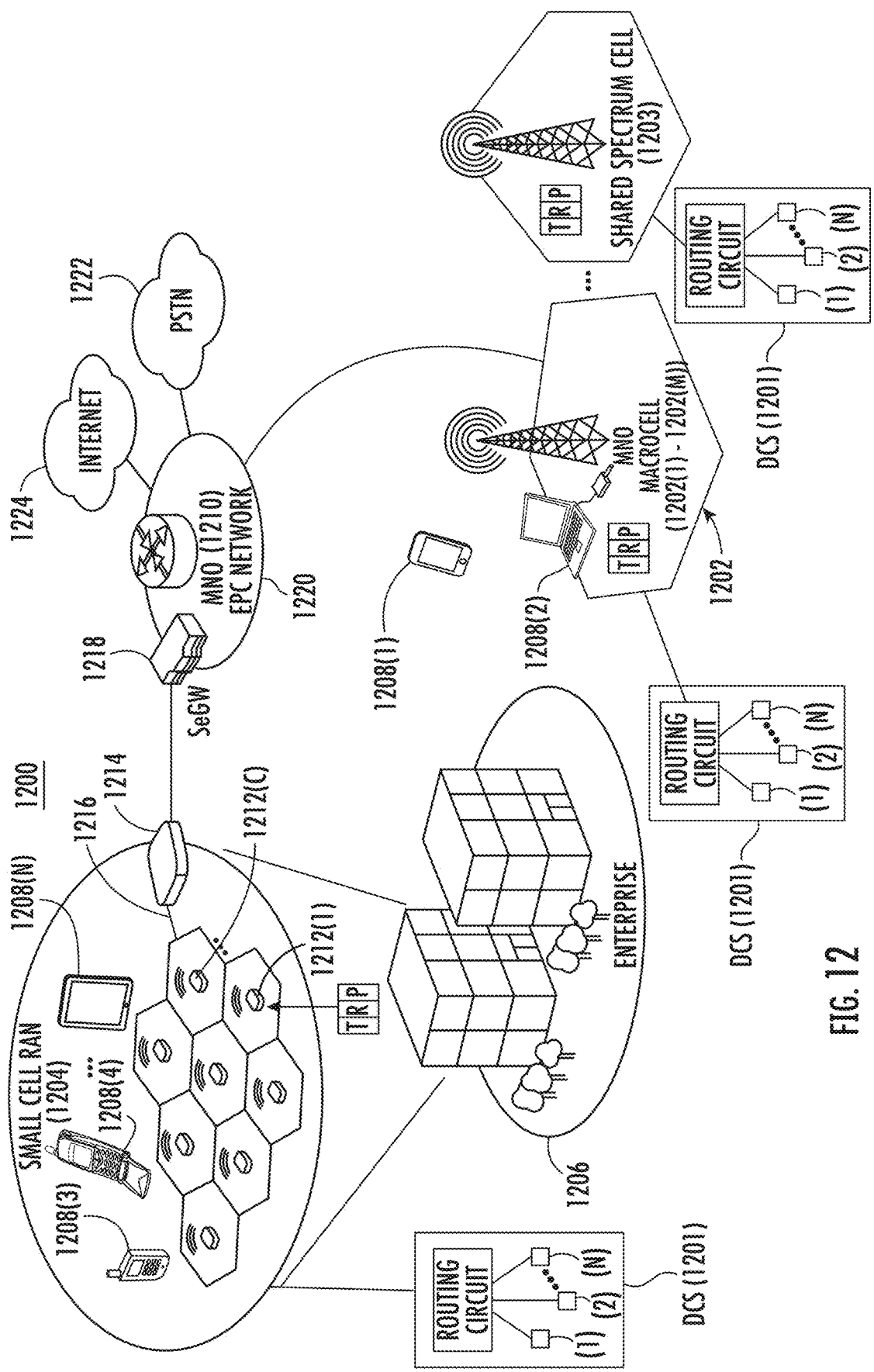
FIG. 12 is a schematic diagram of an exemplary mobile telecommunications environment that can includes the WCS of FIG. 3 that includes the wireless node of FIG. 4 for supporting coverage cluster-based beamforming.

The WCS 300 of FIG. 3 and the wireless node 400 of FIG. 4, configured to support coverage cluster-based beamforming, can also be interfaced with different types of radio nodes of service providers and/or supporting service providers, including macrocell systems, small cell systems, and remote radio heads (RRH) systems, as examples. For example, FIG. 12 is a schematic diagram of an exemplary mobile telecommunications environment 1200 (also referred to as "environment 1200") that includes radio nodes and cells that may support shared spectrum, such as unlicensed spectrum, and can be interfaced to shared spectrum WCSs 1201 supporting coordination of distribution of shared spectrum from multiple service providers to remote units to be distributed to subscriber devices. The shared spectrum WCSs 1201 can include the WCS 300 of FIG. 3 that includes the wireless node 400 of FIG. 4, as an example.

The environment 1200 includes exemplary macrocell RANs 1202(1)-1202(M) ("macrocells 1202(1)-1202(M)") and an exemplary small cell RAN 1204 located within an enterprise environment 1206 and configured to service mobile communications between a user mobile communications device 1208(1)-1208(N) to a mobile network operator (MNO) 1210. A serving RAN for the user mobile communications devices 1208(1)-1208(N) is a RAN or cell in the RAN in which the user mobile communications devices 1208(1)-1208(N) have an established communications session with the exchange of mobile communications signals for mobile communications. Thus, a serving RAN may also be referred to herein as a serving cell. For example, the user mobile communications devices 1208(3)-1208(N) in FIG. 12 are being serviced by the small cell RAN 1204, whereas the user mobile communications devices 1208(1) and 1208(2) are being serviced by the macrocell 1202. The macrocell 1202 is an MNO macrocell in this example. However, a shared spectrum RAN 1203 (also referred to as "shared spectrum cell 1203") includes a macrocell in this example and supports communications on frequencies that are not solely licensed to a particular MNO, such as CBRS for example, and thus may service user mobile communications devices 1208(1)-1208(N) independent of a particular MNO. For example, the shared spectrum cell 1203 may be operated by a third party that is not an MNO and wherein the shared spectrum cell 1203 supports CBRS. Also, as shown in FIG. 12, the MNO macrocell 1202, the shared spectrum cell 1203, and/or the small cell RAN 1204 can interface with a shared spectrum WCS 1201 supporting coordination of distribution of shared spectrum from multiple service providers to remote units to be distributed to subscriber devices. The MNO macrocell 1202, the shared spectrum cell 1203, and the small cell RAN 1204 may be neighboring radio access systems to each other, meaning that some or all can be in proximity to each other such that a user mobile communications device 1208(3)-1208(N) may be able to be in communications range of two or more of the MNO macrocell 1202, the shared spectrum cell 1203, and the small cell RAN 1204 depending on the location of the user mobile communications devices 1208(3)-1208(N).

In FIG. 12, the mobile telecommunications environment 1200 in this example is arranged as an LTE system as described by the Third Generation Partnership Project (3GPP) as an evolution of the GSM/UMTS standards (Global System for Mobile communication/Universal Mobile Telecommunications System). It is emphasized, however, that the aspects described herein may also be applicable to other network types and protocols. The mobile telecommunications environment 1200 includes the enterprise environment 1206 in which the small cell RAN 1204 is implemented. The small cell RAN 1204 includes a plurality of small cell radio nodes 1212(1)-1212(C). Each small cell radio node 1212(1)-1212(C) has a radio coverage area (graphically depicted in the drawings as a hexagonal shape) that is commonly termed a "small cell." A small cell may also be referred to as a femtocell or, using terminology defined by 3GPP, as a Home Evolved Node B (HeNB). In the description that follows, the term "cell" typically means the combination of a radio node and its radio coverage area unless otherwise indicated.

In FIG. 12, the small cell RAN 1204 includes one or more services nodes (represented as a single services node 1214) that manage and control the small cell radio nodes 1212(1)-1212(C). In alternative implementations, the management and control functionality may be incorporated into a radio node, distributed among nodes, or implemented remotely (i.e., using infrastructure external to the small cell RAN 1204). The small cell radio nodes 1212(1)-1212(C) are coupled to the services node 1214 over a direct or local area network (LAN) connection 1216 as an example, typically using secure IPsec tunnels. The small cell radio nodes 1212(1)-1212(C) can include multi-operator radio nodes. The services node 1214 aggregates voice and data traffic from the small cell radio nodes 1212(1)-1212(C) and provides connectivity over an IPsec tunnel to a security gateway (SeGW) 1218 in a network 1220 (e.g., evolved packet core (EPC) network in a 4G network, or 5G Core in a 5G network) of the MNO 1210. The network 1220 is typically configured to communicate with a public switched telephone network (PSTN) 1222 to carry circuit-switched traffic, as well as for communicating with an external packet-switched network such as the Internet 1224.

The environment 1200 also generally includes a node (e.g., eNodeB or gNodeB) base station, or "macrocell" 1202. The radio coverage area of the macrocell 1202 is typically much larger than that of a small cell where the extent of coverage often depends on the base station configuration and surrounding geography. Thus, a given user mobile communications device 1208(3)-1208(N) may achieve connectivity to the network 1220 (e.g., EPC network in a 4G network, or 5G Core in a 5G network) through either a macrocell 1202 or small cell radio node 1212(1)-1212(C) in the small cell RAN 1204 in the environment 1200.

Figure 13:
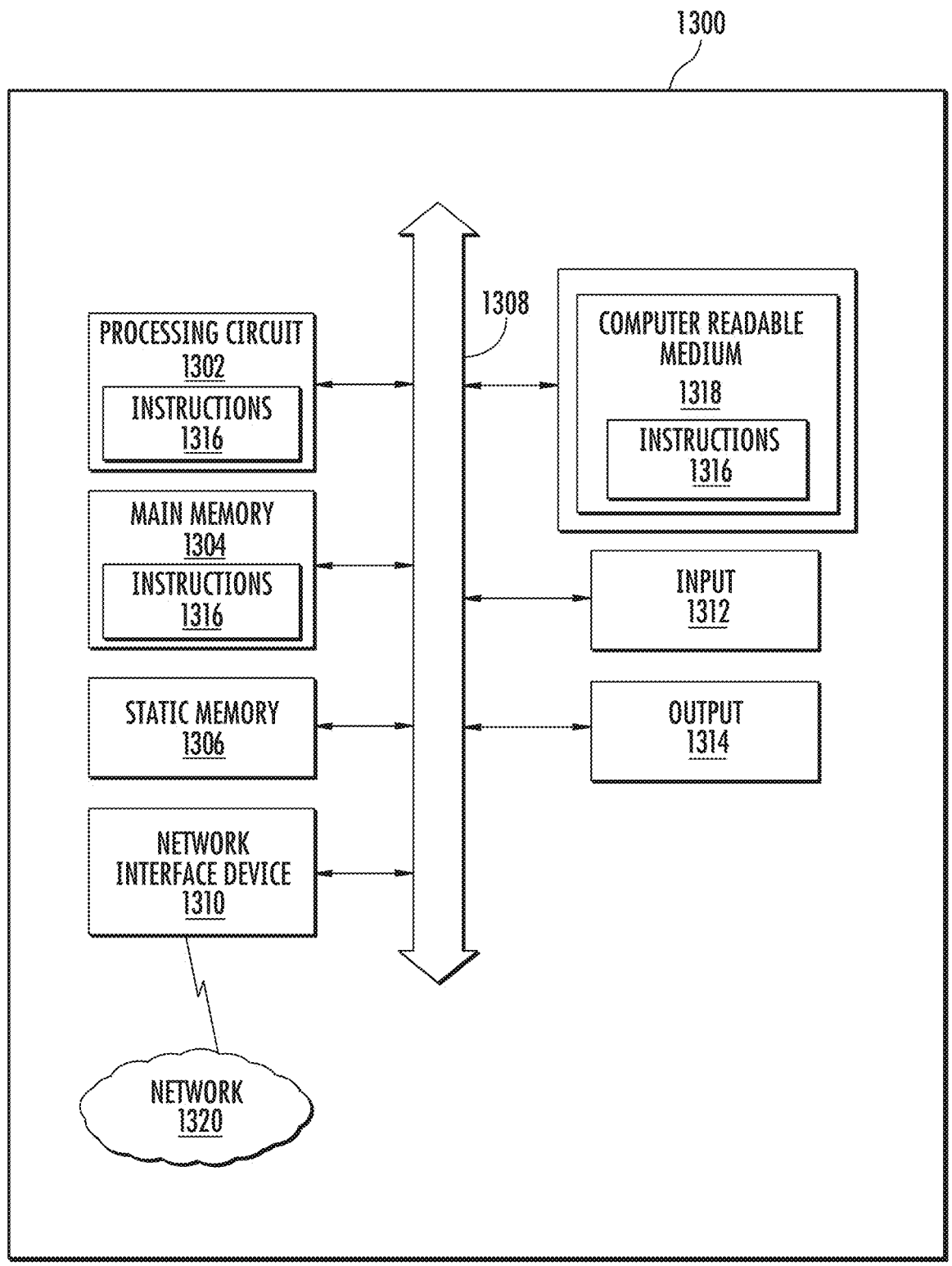
FIG. 13 is a schematic diagram of a representation of an exemplary computer system that can be included in or interfaced with any of the components in the WCS of FIG. 3 and the wireless node in FIG. 4 for supporting coverage cluster-based beamforming, wherein the exemplary computer system is configured to execute instructions from an exemplary computer-readable medium.

Any of the circuits in the WCS 300 of FIG. 3 and the wireless node 400 of FIG. 4, such as the processing circuit 416, can include a computer system 1300, such as that shown in FIG. 13, to carry out their functions and operations. With reference to FIG. 13, the computer system 1300 includes a set of instructions for causing the multi-operator radio node component(s) to provide its designed functionality, and the circuits discussed above. The multi-operator radio node component(s) may be connected (e.g., networked) to other machines in a LAN, an intranet, an extranet, or the Internet. The multi-operator radio node component(s) may operate in a client-server network environment, or as a peer machine in a peer-to-peer (or distributed) network environment. While only a single device is illustrated, the term "device" shall also be taken to include any collection of devices that individually or jointly execute a set (or multiple sets) of instructions to perform any one or more of the methodologies discussed herein. The multi-operator radio node component(s) may be a circuit or circuits included in an electronic board card, such as a printed circuit board (PCB) as an example, a server, a personal computer, a desktop computer, a laptop computer, a personal digital assistant (PDA), a computing pad, a mobile device, or any other device, and may represent, for example, a server, edge computer, or a user's computer. The exemplary computer system 1300 in this embodiment includes a processing circuit or processor 1302, a main memory 1304 (e.g., read-only memory (ROM), flash memory, dynamic random access memory (DRAM) such as synchronous DRAM (SDRAM), etc.), and a static memory 1306 (e.g., flash memory, static random access memory (SRAM), etc.), which may communicate with each other via a data bus 1308. Alternatively, the processing circuit 1302 may be connected to the main memory 1304 and/or static memory 1306 directly or via some other connectivity means. The processing circuit 1302 may be a controller, and the main memory 1304 or static memory 1306 may be any type of memory.

The processing circuit 1302 represents one or more general-purpose processing circuits such as a microprocessor, central processing unit, or the like. More particularly, the processing circuit 1302 may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing circuit 1302 is configured to execute processing logic in instructions 1316 for performing the operations and steps discussed herein.

The computer system 1300 may further include a network interface device 1310. The computer system 1300 also may or may not include an input 1312 to receive input and selections to be communicated to the computer system 1300 when executing instructions. The computer system 1300 also may or may not include an output 1314, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 1300 may or may not include a data storage device that includes instructions 1316 stored in a computer-readable medium 1318. The instructions 1316 may also reside, completely or at least partially, within the main memory 1304 and/or within the processing circuit 1302 during execution thereof by the computer system 1300, the main memory 1304 and the processing circuit 1302 also constituting the computer-readable medium 1318. The instructions 1316 may further be transmitted or received over a network 1320 via the network interface device 1310.

While the computer-readable medium 1318 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the processing circuit and that cause the processing circuit to perform any one or more of the methodologies of the embodiments disclosed herein. The term "computer-readable medium" shall accordingly be taken to include, but not be limited to, solid-state memories, optical and magnetic medium, and carrier wave signals.

Note that as an example, any "ports," "combiners," "splitters," and other "circuits" mentioned in this description may be implemented using Field Programmable Logic Array(s) (FPGA(s)) and/or a digital signal processor(s) (DSP(s)), and therefore, may be embedded within the FPGA or be performed by computational processes.

The embodiments disclosed herein include various steps. The steps of the embodiments disclosed herein may be performed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes a machine-readable storage medium (e.g., read only memory ("ROM"), random access memory ("RAM"), magnetic disk storage medium, optical storage medium, flash memory devices, etc.).

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A controller may be a processor. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

We claim:

1. A wireless node, comprising:
   an antenna array comprising a plurality of antenna elements and configured to emit a predetermined number of radio frequency (RF) beams toward a plurality of coverage points in a coverage area; and
   a processing circuit configured to:
      determine a respective clustering distance metric between each pair of the plurality of coverage points; and
      group the plurality of coverage points into a predetermined number of coverage clusters based on the respective clustering distance metric between each pair of the plurality of coverage points, wherein each of the predetermined number of coverage clusters comprises a subset of the plurality of coverage points and receives a respective one of the predetermined number of RF beams.

2. The wireless node of claim 1, wherein the respective clustering distance metric between each pair of the plurality of coverage points comprises a weighted distance metric of the pair of the plurality of coverage points.

3. The wireless node of claim 2, wherein the processing circuit is further configured to:
   determine a plurality of coverage positions for the plurality of coverage points, respectively, the plurality of coverage positions each comprising:
      an array factor defining a set of steering phases between each of the plurality of antenna elements and a respective one of the plurality of coverage points;
      a three-dimensional (3D) geometric position of the respective one of the plurality of coverage points; and
      a path loss between each of the plurality of antenna elements and the respective one of the plurality of coverage points; and
   apply a set of weights to a respective pair of the plurality of coverage positions associated with the pair of the plurality of coverage points to thereby determine the weighted distance metric of the pair of the plurality of coverage points.

4. The wireless node of claim 2, wherein the processing circuit is further configured to:
   group the plurality of coverage points into the predetermined number of coverage clusters by executing a hierarchical clustering algorithm based on the respective clustering distance metric between each pair of the plurality of coverage points; and
   generate a clustering information element comprising the predetermined number of coverage clusters and the respective clustering distance metric between each pair of the plurality of coverage points.

5. The wireless node of claim 4, further comprising:
   a codeword synthesis circuit coupled to the processing circuit and configured to generate a predetermined number of codewords each corresponding to a respective one of the predetermined number of RF beams based on the clustering information element; and
   a beamformer circuit configured to:
      process an RF signal based on each of the predetermined number of codewords to generate a plurality of beamforming RF signals; and
      provide the plurality of beamforming RF signals to the plurality of antenna elements, respectively, to thereby form a respective one of the predetermined number of RF beams.

6. The wireless node of claim 2, wherein the processing circuit is further configured to:
   group the plurality of coverage points into the predetermined number of coverage clusters by executing an k-means clustering algorithm based on the respective clustering distance metric between each pair of the plurality of coverage points;
   determine a centroid coverage point in each of the plurality of coverage clusters, and
   generate a predetermined number of codewords for the centroid coverage point in the plurality of coverage clusters based on the predetermined number of coverage clusters and the respective clustering distance metric between each pair of the plurality of coverage points.

7. The wireless node of claim 6, further comprising a beamformer circuit configured to:
   process an RF signal based on each of the predetermined number of codewords to generate a plurality of beamforming RF signals; and
   provide the plurality of beamforming RF signals to the plurality of antenna elements, respectively, to thereby form a respective one of the predetermined number of RF beams.

8. The wireless node of claim 1, wherein the processing circuit is further configured to adjust the subset of the plurality of coverage points comprised in each of the predetermined number of coverage clusters such that each of the predetermined number of coverage clusters includes a similar number of the plurality of coverage points.

9. A method for supporting coverage cluster-based beamforming in a wireless node in a wireless communications system (WCS), comprising:
   determining a respective clustering distance metric between each pair of a plurality of coverage points configured to receive a predetermined number of radio frequency (RF) beams emitted from the wireless node; and
   grouping the plurality of coverage points into a predetermined number of coverage clusters based on the respective clustering distance metric between each pair of the plurality of coverage points, wherein each of the predetermined number of coverage clusters comprises a subset of the plurality of coverage points and receives a respective one of the predetermined number of RF beams.

10. The method of claim 9, wherein the respective clustering distance metric between each pair of the plurality of coverage points comprises a weighted distance metric of the pair of the plurality of coverage points.

11. The method of claim 10, further comprising:
   determining a plurality of coverage positions for the plurality of coverage points, respectively, the plurality of coverage positions each comprising:
      an array factor defining a set of steering phases between each of a plurality of antenna elements and a respective one of the plurality of coverage points;
      a three-dimensional (3D) geometric position of the respective one of the plurality of coverage points; and
      a path loss between each of the plurality of antenna elements and the respective one of the plurality of coverage points; and applying a set of weights to a respective pair of the plurality of coverage positions associated with the pair of the plurality of coverage points to thereby determine the weighted distance metric of the pair of the plurality of coverage points.

12. The method of claim 10, further comprising:
grouping the plurality of coverage points into the predetermined number of coverage clusters by executing a hierarchical clustering algorithm based on the respective clustering distance metric between each pair of the plurality of coverage points; and
generating a clustering information element comprising the predetermined number of coverage clusters and the respective clustering distance metric between each pair of the plurality of coverage points.

13. The method of claim 12, further comprising:
generating a predetermined number of codewords each corresponding to a respective one of the predetermined number of RF beams based on the clustering information element;
processing an RF signal based on each of the predetermined number of codewords to generate a plurality of beamforming RF signals; and
forming a respective one of the predetermined number of RF beams based on the plurality of beamforming RF signals.

14. The method of claim 10, further comprising:
grouping the plurality of coverage points into the predetermined number of coverage clusters by executing an k-means clustering algorithm based on the respective clustering distance metric between each pair of the plurality of coverage points;
determining a centroid coverage point in each of the plurality of coverage clusters; and
generating a predetermined number of codewords for the centroid coverage point in the plurality of coverage clusters based on the predetermined number of coverage clusters and the respective clustering distance metric between each pair of the plurality of coverage points.

15. The method of claim 14, further comprising:
processing an RF signal based on each of the predetermined number of codewords to generate a plurality of beamforming RF signals; and
forming a respective one of the predetermined number of RF beams based on the plurality of beamforming RF signals.

16. The method of claim 9, further comprising adjusting the subset of the plurality of coverage points comprised in each of the predetermined number of coverage clusters such that each of the predetermined number of coverage clusters includes a similar number of the plurality of coverage points.

17. A wireless communications system (WCS), comprising:
a centralized services node coupled to a service node;
at least one radio node coupled to the centralized services node;
at least one open radio access network (O-RAN) remote unit coupled to the centralized services node via a distribution unit; and
a distributed communications system (DCS) comprising:
a routing unit (RU) coupled to the centralized services node via a baseband unit (BBU); and
a plurality of remote units coupled to the RU;
wherein at least one of the at least one radio node, the at least one O-RAN remote unit, and the plurality of remote units comprises:
an antenna array comprising a plurality of antenna elements and configured to emit a respective downlink communications signal in a predetermined number of radio frequency (RF) beams toward a plurality of coverage points in a coverage area; and
a processing circuit configured to:
determine a respective clustering distance metric between each pair of the plurality of coverage points; and
group the plurality of coverage points into a predetermined number of coverage clusters based on the respective clustering distance metric between each pair of the plurality of coverage points, wherein each of the predetermined number of coverage clusters comprises a subset of the plurality of coverage points and receives a respective one of the predetermined number of RF beams.

18. The WCS of claim 17, wherein the DRU is configured to:
distribute a plurality of downlink communications signals to the plurality of remote units, respectively; and
receive a plurality of uplink communications signals from the plurality of remote units, respectively.

19. The WCS of claim 18, wherein the plurality of remote units is coupled to the RU via a plurality of optical fiber-based communications mediums.

20. The WCS of claim 19, wherein:
the RU comprises:
an electrical-to-optical (E/O) converter configured to convert the plurality of downlink communications signals into a plurality of downlink optical communications signals, respectively; and
an optical-to-electrical (O/E) converter configured to convert a plurality of uplink optical communications signals into the plurality of uplink communications signals, respectively; and
the plurality of remote units each comprises:
a respective O/E converter configured to convert a respective one of the plurality of downlink optical communications signals into a respective one of the plurality of downlink communications signals; and
a respective E/O converter configured to convert a respective one of the plurality of uplink communications signals into a respective one of the plurality of uplink optical communications signals.

\* \* \* \* \*